United States Patent
Hoshina et al.

(10) Patent No.: US 10,854,931 B2
(45) Date of Patent: Dec. 1, 2020

(54) ACTIVE MATERIAL, NONAQUEOUS ELECTROLYTE BATTERY, BATTERY PACK, AND VEHICLE

(71) Applicant: KABUSHIKI KAISHA TOSHIBA, Minato-ku (JP)

(72) Inventors: Keigo Hoshina, Kashiwazaki (JP); Fumihiro Tejima, Kawasaki (JP); Yorikazu Yoshida, Yokohama (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 400 days.

(21) Appl. No.: 15/392,851

(22) Filed: Dec. 28, 2016

(65) Prior Publication Data
US 2017/0271720 A1    Sep. 21, 2017

(30) Foreign Application Priority Data

Mar. 15, 2016   (JP) ................. 2016-051360

(51) Int. Cl.
*H01M 10/42*    (2006.01)
*C01G 51/00*    (2006.01)
(Continued)

(52) U.S. Cl.
CPC ........ *H01M 10/425* (2013.01); *C01G 33/006* (2013.01); *C01G 39/006* (2013.01);
(Continued)

(58) Field of Classification Search
None
See application file for complete search history.

(56) References Cited

U.S. PATENT DOCUMENTS

2008/0078594 A1*  4/2008  Harada ............... C01G 23/002
                                                                 429/122
2013/0316242 A1  11/2013  Matsuno et al.
(Continued)

FOREIGN PATENT DOCUMENTS

CN          105977455 A      9/2016
EP          3 067 968 A1     9/2016
(Continued)

OTHER PUBLICATIONS

Yin, S.Y. et al. "Reversible Lithium Storage in Na2Li2Ti6O14 as Anode for Lithium Ion Batteries". Electrochemistry Communications, vol. 11, No. 6, 2009, pp. 1251-1254. doi:10.1016/j.elecom. 2009.04.013. (Year: 2009).*

(Continued)

*Primary Examiner* — Robert S Carrico
(74) *Attorney, Agent, or Firm* — Oblon, McClelland, Maier & Neustadt, L.L.P.

(57) ABSTRACT

According to one embodiment, an active material is provided. This active material includes active material particles containing orthorhombic Na-containing niobium titanium composite oxide, and satisfies the following formula (1):

$$1 \leq A5/A0 \tag{1}$$

where A5 is a mole content ratio of a Li mole content L5 to a total of a Ti mole content T5 and a Nb mole content N5, and A0 is a mole content ratio of a Li mole content L0 to a total of a Ti mole content T0 and a Nb mole content N0.

14 Claims, 8 Drawing Sheets

(51) Int. Cl.
    *C01G 33/00*    (2006.01)
    *C01G 39/00*    (2006.01)
    *C01G 49/00*    (2006.01)
    *C01G 45/12*    (2006.01)
    *H01M 2/30*    (2006.01)
    *H01M 4/485*    (2010.01)
    *H01M 4/505*    (2010.01)
    *H01M 4/525*    (2010.01)
    *H01M 4/58*    (2010.01)
    *H01M 10/44*    (2006.01)

(52) U.S. Cl.
    CPC ......... *C01G 45/12* (2013.01); *C01G 49/0027* (2013.01); *C01G 51/42* (2013.01); *H01M 2/305* (2013.01); *H01M 4/485* (2013.01); *H01M 4/505* (2013.01); *H01M 4/525* (2013.01); *H01M 4/5825* (2013.01); *H01M 10/44* (2013.01); *C01P 2002/85* (2013.01); *H01M 2220/20* (2013.01)

(56) References Cited

U.S. PATENT DOCUMENTS

| | | | |
|---|---|---|---|
| 2013/0343983 A1* | 12/2013 | Ito | H01M 4/485 423/598 |
| 2014/0295231 A1* | 10/2014 | Ise | H01M 10/482 429/90 |
| 2015/0086872 A1 | 3/2015 | Ise et al. | |
| 2015/0129797 A1 | 5/2015 | Ise et al. | |
| 2016/0141615 A1 | 5/2016 | Nakayama et al. | |
| 2016/0268603 A1 | 9/2016 | Harada et al. | |

FOREIGN PATENT DOCUMENTS

| | | | |
|---|---|---|---|
| JP | 2011-26188 A | | 2/2011 |
| JP | 2012-51740 A | | 3/2012 |
| JP | 2012-79560 | | 4/2012 |
| JP | 2014055080 A | * | 3/2014 |
| JP | 2014-209445 A | | 11/2014 |
| JP | 2015-84321 | | 4/2015 |
| JP | 2015-111550 | | 6/2015 |
| JP | 6058836 B2 | | 1/2017 |
| WO | WO 2015/019922 A1 | | 2/2015 |
| WO | WO 2015/087734 A1 | | 6/2015 |
| WO | WO 2017/073765 A1 | | 5/2017 |

OTHER PUBLICATIONS

Machine Translation of JP 2014-055080 A (Year: 2014).*
Extended European Search Report dated Jul. 10, 2017 in Patent Application No. 16206205.3.
Pengfei Wang, et al., "Improved lithium storage performance of lithium sodium titanate anode by titanium site substitution with aluminum" Journal of Power Sources, vol. 293, XP055285710, 2015, pp. 33-41.
Bingbing Tian, et al., "Niobium doped lithium titanate as a high rate anode material for Li-ion batteries" Electrochimica Acta, vol. 55, XP027474713, 2010, pp. 5453-5458.

* cited by examiner

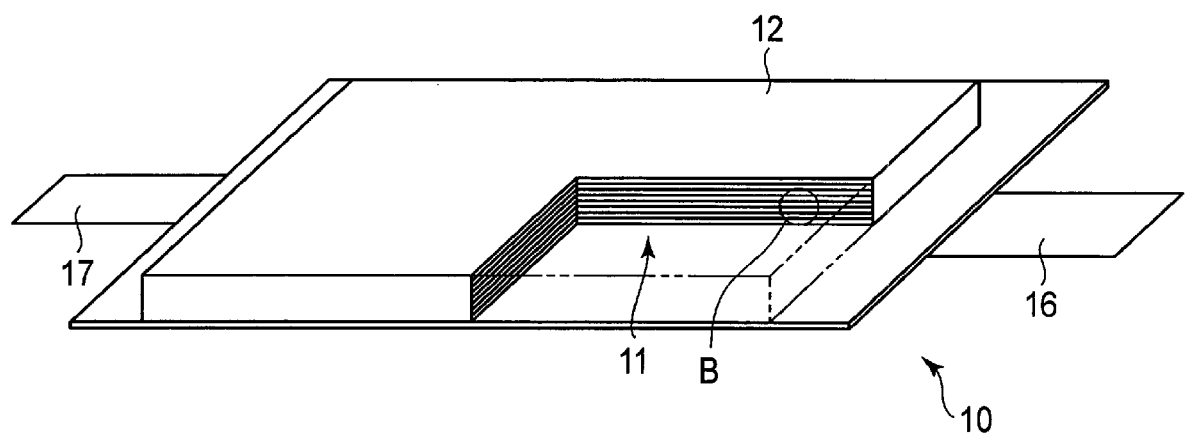
F I G. 3
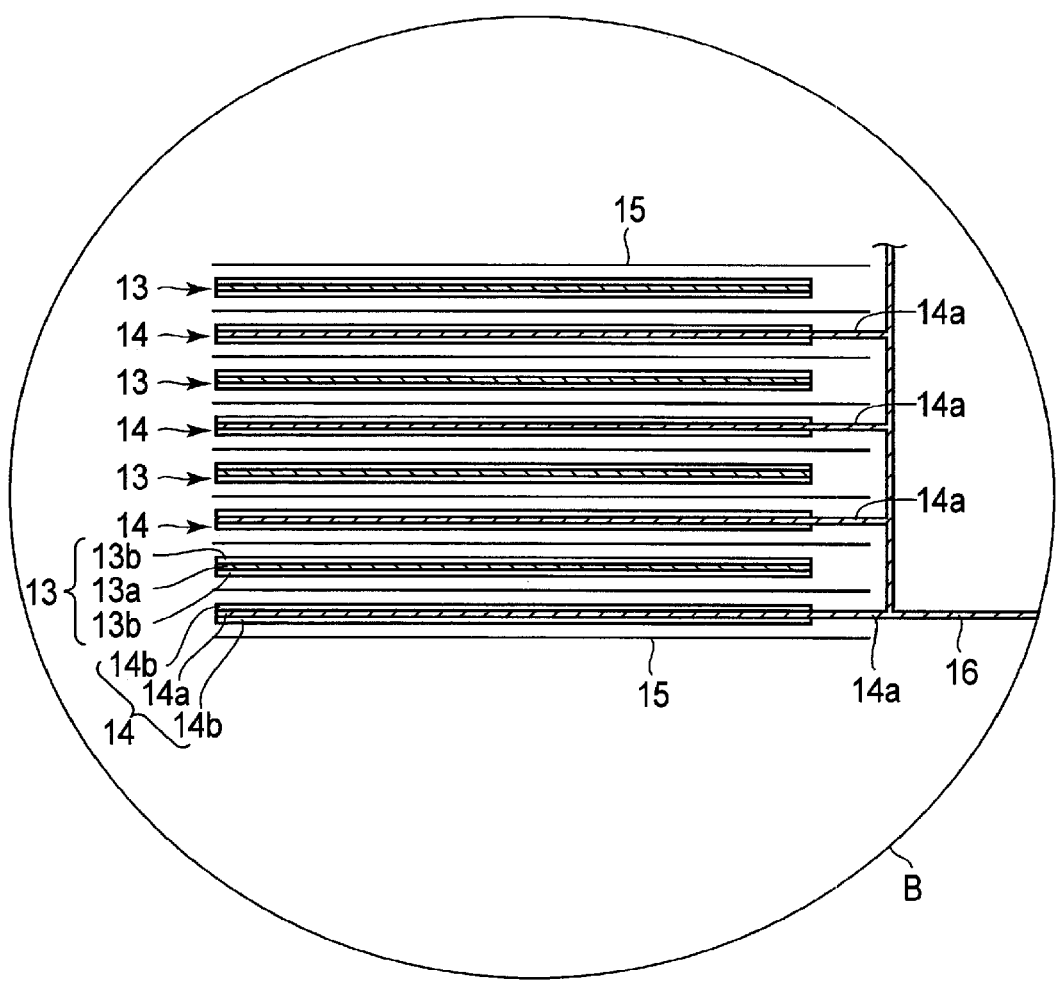
F I G. 4

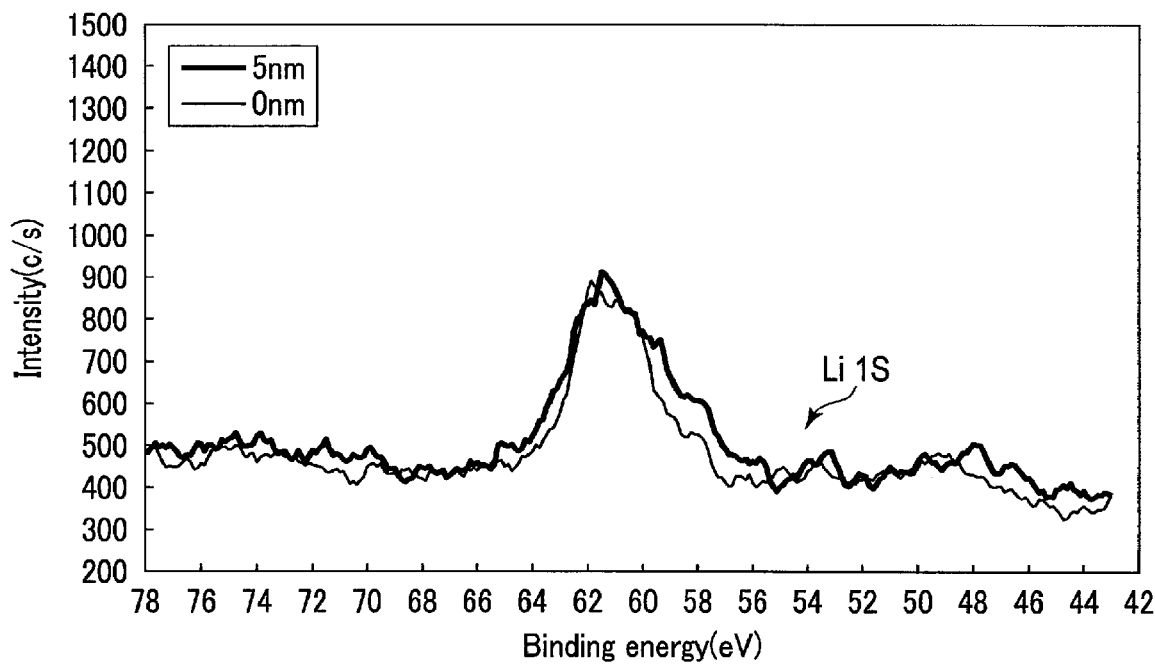
F I G. 7
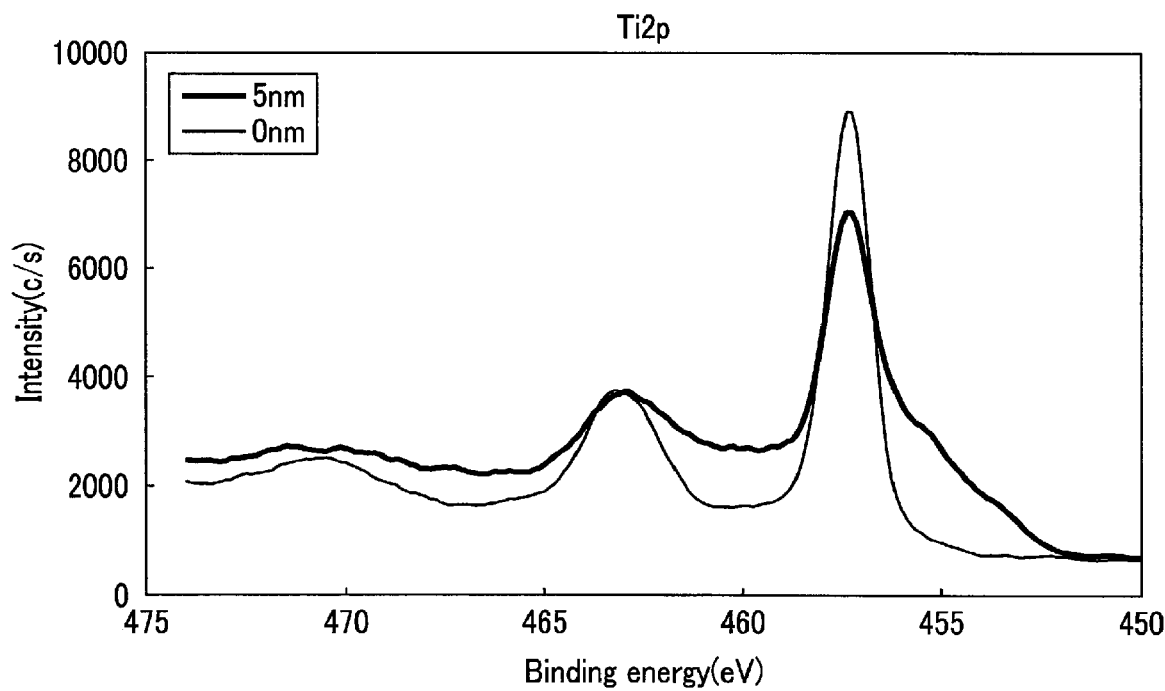
F I G. 8

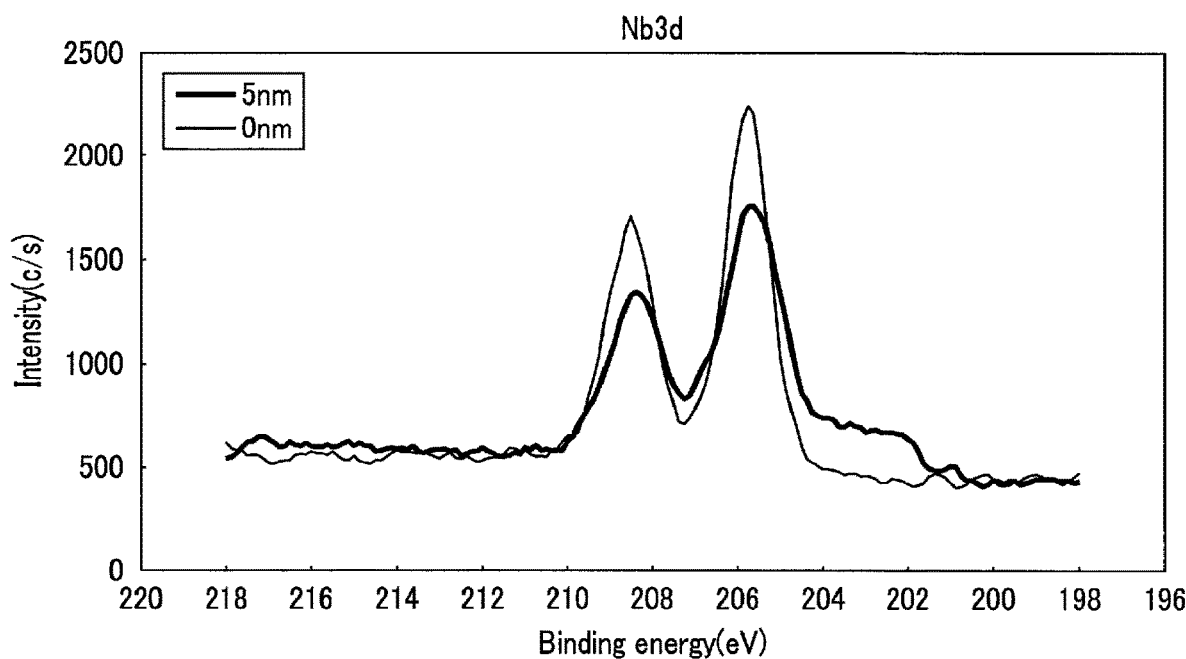
F I G. 9
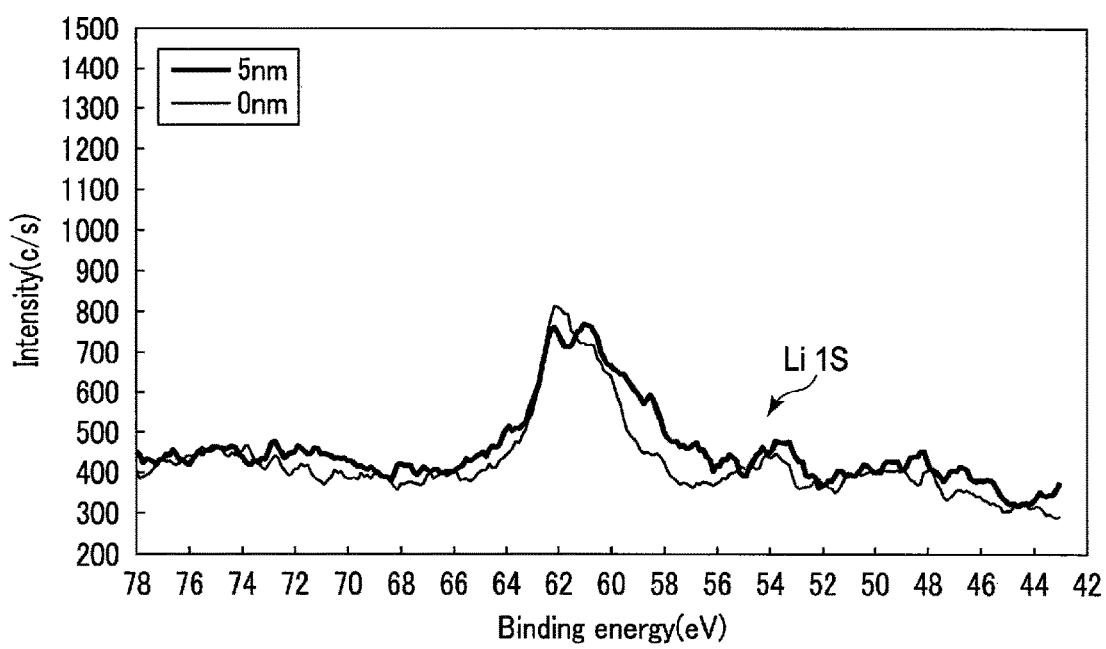
F I G. 10

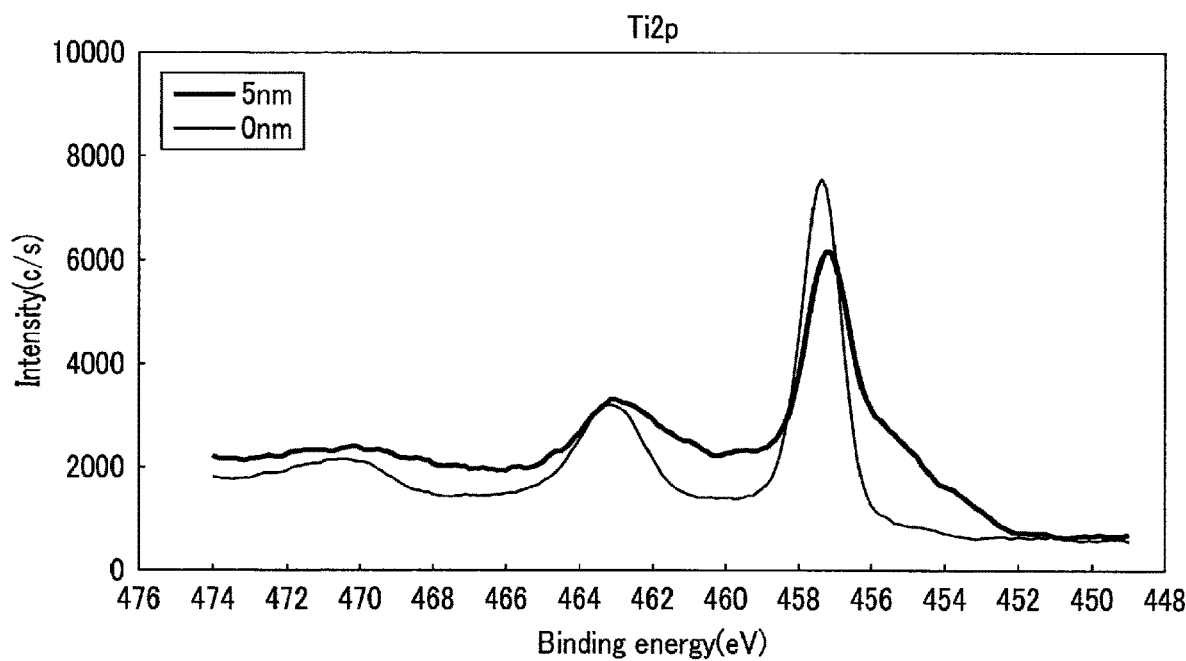
F I G. 11
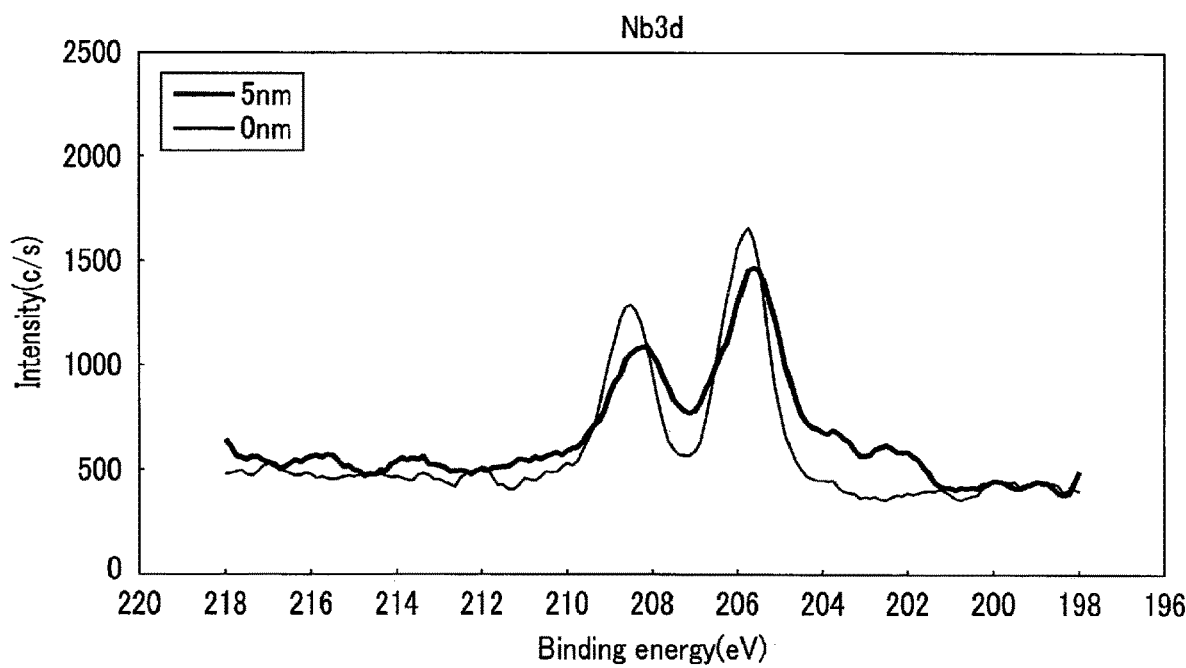
F I G. 12

ACTIVE MATERIAL, NONAQUEOUS ELECTROLYTE BATTERY, BATTERY PACK, AND VEHICLE

CROSS-REFERENCE TO RELATED APPLICATIONS

This application is based upon and claims the benefit of priority from Japanese Patent Application No. 2016-051360, filed Mar. 15, 2016, the entire contents of which are incorporated herein by reference.

FIELD

Embodiments of the present invention relate to an active material, a nonaqueous electrolyte battery, a battery pack, and a vehicle.

BACKGROUND

Much research has been conducted regarding nonaqueous electrolyte batteries which charge and discharge electricity by transfer of lithium ions from a negative electrode to a positive electrode and vice versa as high-energy density batteries.

In addition to the use as a power supply for small electronic devices, the nonaqueous electrolyte battery is expected to be used as a medium-to-large power supply for vehicles and stationary applications. In such medium-to-large applications, long life characteristics and high safety are demanded. In addition, high input-output characteristics are also required.

As the nonaqueous electrolyte battery having life characteristics and high safety, a nonaqueous electrolyte battery using spinel lithium titanate for a negative electrode is known. However, since the spinel lithium titanate has a high lithium insertion/extraction potential of about 1.55 V (vs. Li/Li$^+$), the nonaqueous electrolyte battery using spinel lithium titanate for the negative electrode has a low battery voltage. Since the spinel lithium titanate shows a flat charge-discharge curve in the lithium insertion/extraction potential range, it is characterized by very small change in a potential caused by change in a charging state.

A further improvement in the life characteristics is required in such a nonaqueous electrolyte battery.

BRIEF DESCRIPTION OF THE DRAWINGS

FIG. 3 shows a partial cutaway perspective view schematically showing another example of a nonaqueous electrolyte battery according to a second embodiment;

FIG. 4 shows an enlarged cross-sectional view of a part B of FIG. 3;

FIG. 7 shows spectrum data of a Li1S peak obtained by X-ray photoelectron spectroscopy (XPS) according to Example 1;

FIG. 8 shows spectrum data of a Ti2p peak obtained by XPS according to Example 1;

FIG. 9 shows spectrum data of a Nb3d peak obtained by XPS according to Example 1;

FIG. 10 shows spectrum data of a Li1S peak obtained by XPS according to Comparative Example 1;

FIG. 11 shows spectrum data of a Ti2p peak obtained by XPS according to Comparative Example 1;

FIG. 12 shows spectrum data of a Nb3d peak obtained by XPS according to Comparative Example 1.

DETAILED DESCRIPTION

Figure 1:
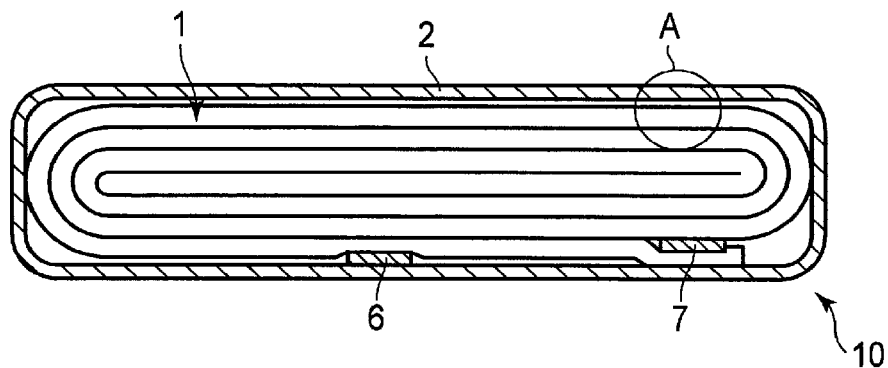
FIG. 1 shows a cross-sectional view showing an example of a nonaqueous electrolyte battery according to a second embodiment.

According to the first embodiment, an active material is provided. This active material includes active material particles containing orthorhombic Na-containing niobium titanium composite oxide, and satisfies the following formula (1):

$$1 \leq A5/A0 \tag{1}$$

where A5 is a mole content ratio of a Li mole content L5 to a total of a Ti mole content T5 and a Nb mole content N5, and each of the Li mole content L5, the Ti mole content T5, and the Nb mole content N5 is a value according to an X-ray photoelectron spectroscopy measurement, obtained at a depth of 5 nm from surfaces of the active material particles, and A0 is a mole content ratio of a Li mole content L0 to a total of a Ti mole content T0 and a Nb mole content N0, and each of the Li mole content L0, the Ti mole content T0, and the Nb mole content N0 is a value according to the X-ray photoelectron spectroscopy measurement, obtained at the surfaces of the active material particles.

According to a second embodiment, a nonaqueous electrolyte battery is provided. This nonaqueous electrolyte battery includes a positive electrode, a negative electrode containing the active material according to the first embodiment, and a nonaqueous electrolyte.

According to a third embodiment, a battery pack is provided. This battery pack includes the nonaqueous electrolyte battery according to the second embodiment.

According to a fourth embodiment, a vehicle is provided. The vehicle includes the battery pack according to the third embodiment.

Embodiments are explained below referring to drawings. In the following descriptions, the same reference number is applied to structural features having the same or similar function throughout all drawings, and overlapped explanations are omitted. Each drawing is a schematic view for explaining the embodiment and promoting the understanding thereof. Shapes, sizes and ratios in the drawing, accordingly, may be different from those in a practical apparatus, but they may be appropriately designed and changed considering the following descriptions and known technology.

First Embodiment

According to the first embodiment, a battery active material is provided. This battery active material includes active material particles containing orthorhombic Na-containing niobium titanium composite oxide. In the battery active material, a mole content ratio A5 of Li to Ti and Nb at a depth of 5 nm from a surface of the active material particles with respect to a mole content ratio A0 of Li to Ti and Nb at the surface of the active material particles, obtained by X-ray photoelectron spectroscopy measurement satisfies the following formula (1).

$$1 \leq A5/A0 \tag{1}$$

A5 is a mole content ratio of a Li mole content L5 to a total of a Ti mole content T5 and a Nb mole content N5, each of the Li mole content L5, the Ti mole content T5, and the Nb mole content N5 is obtained by performing X-ray photoelectron spectroscopy measurement at a depth of 5 nm from a surface of the active material particles.

A0 is a mole content ratio of a Li mole content L0 to a total of a Ti mole content T0 and a Nb mole content N0, each of the Li mole content L0, the Ti mole content T0, and the Nb mole content N0 is obtained by performing X-ray photoelectron spectroscopy measurement at the surface of the active material particles.

This battery active material can suppress a side reaction with a nonaqueous electrolyte, which provides an improvement in life characteristics. The resistance can be reduced as a result of the suppression of the side reaction, which also provides an improvement in rate characteristics. The ratio A5 is preferably larger than the ratio A0. The ratio A5/A0 is preferably 2.0 or less. The ratio A5/A0 more preferably satisfies $1.2 \leq A5/A0 \leq 1.6$.

The mole content ratio of Li to Ti and Nb(Li/(Ti+Nb)) may be gradually increased toward the inside of the active material particles from the surface thereof. For example, the mole content ratio of the active material particles is gradually increased toward a position at a depth of 5 nm from the surface thereof from a position of the surface thereof. In this case, the side reaction between the electrolysis solution and the active material in the surface is suppressed, which can suppress an increase in resistance.

Herein, the mole content ratio of Li to Ti and Nb at a depth of 1 nm from the surface of the active material particles is defined as A1; the mole content ratio of Li to Ti and Nb at a depth of 2 nm from the surface of the active material particles is defined as A2; the mole content ratio of Li to Ti and Nb at a depth of 3 nm from the surface of the active material particles is defined as A3; and the mole content ratio of Li to Ti and Nb at a depth of 4 nm from the surface of the active material particles is defined as A4.

For example, ratio A1/A0<ratio A5/A0 is set. For example, ratio A1/A0≤ratio A4/A0<ratio A5/A0 is set. For example, ratio A1/A0≤ratio A3/A0<ratio A4/A0<ratio A5/A0 is set. For example, ratio A1/A0≤ratio A2/A0<ratio A3/A0<ratio A4/A0<ratio A5/A0 is set.

The orthorhombic Na-containing niobium titanium composite oxide is represented, for example, by the general formula $Li_{2+v}Na_{2-w}M1_xTi_{6-y-z}Nb_yM2_zO_{14+\delta}$. In the general formula, M1 is at least one element selected from the group consisting of Cs, K, Sr, Ba, Mg, and Ca; M2 is at least one element selected from the group consisting of Zr, Sn, V, Ta, Mo, W, Fe, Co, Mn, and Al; and $0 \leq v \leq 4$, $0 < w < 2$, $0 \leq x < 2$, $0 < y < 6$, $0 \leq z < 3$, and $-0.5 \leq \delta \leq 0.5$ are set. One kind of each of the elements M1 and M2 may be used alone or two kinds or more may be used in combination.

The lithium insertion/extraction potential of the orthorhombic Na-containing niobium titanium composite oxide can be adjusted by the amount of Na in this composite oxide, for example.

In one aspect, the metal element M1 contains Cs. When the metal element M1 contains Cs, more excellent life characteristic can be achieved. In another aspect, the metal element M1 contains K. When the metal element M1 contains K, more excellent life characteristics can be achieved. In still another aspect, the metal element M1 contains Sr. When the metal element M1 contains Sr, more excellent rate characteristics can be achieved. In yet another aspect, the metal element M1 contains Ba. When the metal element M1 contains Ba, more excellent rate characteristics can be achieved. In a further aspect, the metal element M1 contains Ca. When the metal element M1 contains Ca, more excellent rate characteristics can be achieved. The metal element M1 more preferably contains at least one selected from the group consisting of Sr, Mg, and Ba.

The subscript x is within a range of $0 \leq x < 2$, as described above. When the subscript x is within the range, orthorhombic Na-containing niobium titanium composite oxide having excellent rate characteristics can be obtained. The subscript x is preferably within a range of $0.05 \leq x \leq 0.2$.

The subscript y is within a range of $0 < y < 6$, as described above. When the subscript y is within the range, orthorhombic Na-containing niobium titanium composite oxide having excellent rate characteristics can be obtained. The subscript y is preferably within a range of $0.1 \leq y \leq 1$.

In one aspect, the metal element M2 contains Zr. When the metal element M2 contains Zr, more excellent life characteristics can be achieved. In another aspect, the metal element M2 contains Sn. When the metal element M2 contains Sn, more excellent rate characteristics can be achieved. In still another aspect, the metal element M2 contains V. V can exhibit the same physical and chemical properties as those of Nb. In yet another aspect, the metal element M2 contains Ta. Ta can exhibit the same physical and chemical properties as those of Nb. In a further aspect, the metal element M2 contains Mo. When the metal element M2 contains Mo, more excellent rate characteristics can be achieved. In a still further aspect, the metal element M2 contains W. When the metal element M2 contains W, more excellent rate characteristics can be achieved. In a yet further aspect, the metal element M2 contains Fe. When the metal element M2 contains Fe, more excellent life characteristics can be achieved. In a yet further aspect, the metal element M2 contains Co. When the metal element M2 contains Co, more excellent life characteristics can be achieved. In a yet further aspect, the metal element M2 contains Mn. When the metal element M2 contains Mn, more excellent life characteristics can be achieved. In a yet further aspect, the metal element M2 contains Al. When the metal element M2 contains Al, more excellent rate characteristics can be achieved. The metal element M2 preferably contains at least one selected from the group consisting of Zr, Al, V, and Mo.

The subscript z is within a range of $0 \leq z < 3$. When the subscript z is within the range, orthorhombic Na-containing niobium titanium composite oxide having excellent rate characteristics can be obtained. The subscript z is preferably within a range of $0.1 \leq z \leq 0.3$.

The subscript δ can correspond to the gap of the amount of oxygen from the orthorhombic Na-containing niobium titanium composite oxide which can be represented by the general formula $Li_{2+v}Na_{2-w}M1_xTi_{6-y-z}Nb_yM2_zO_{14+\delta}$. The negative subscript δ may mean that oxygen is less than the stoichiometric proportion. On the other hand, the positive subscript δ may mean that oxygen is more than the stoichiometric proportion. The subscript δ is preferably within a range of $-0.5 \leq \delta \leq 0.5$. When the subscript δ is within the range, both rate characteristics and life characteristics can be achieved. The subscript δ is more preferably within a range of $-0.1 \leq \delta \leq 0.1$.

<X-Ray Photoelectron Spectroscopy (XPS) Measurement>

XPS measurement can be performed in accordance with a method to be described below, for example.

As an apparatus, QuanteraSXM manufactured by PHI is used, for example. Single crystal spectroscopy Al—Kα (1486.6 eV) is used for an excitation X-Ray source, and a photoelectron detection angle is set to 45 degrees. Ion etching is performed by Ar ions at an accelerating voltage of 2 kV, and an etching rate is set to 6.1 nm/min (value based on $SiO_2$). The mole content ratio A0 is a mole content ratio of a Li mole content L0 to a total of a Ti mole content T0 and a Nb mole content N0, and each of the Li mole content L0, the Ti mole content T0, and the Nb mole content N0 is a value according to the X-ray photoelectron spectroscopy measurement, obtained at the surfaces of the active material particles. The mole content ratio A0 can be determined from the measurement results before etching. The mole content ratio A5 is a mole content ratio of a Li mole content L5 to a total of a Ti mole content T5 and a Nb mole content N5, and each of the Li mole content L5, the Ti mole content T5, and the Nb mole content N5 is a value according to an X-ray photoelectron spectroscopy measurement, obtained at a depth of 5 nm from surfaces of the active material particles. Since the surface is gradually etched in the nano-order using Ar ions, a depth of 5 nm from the surface can be determined from an etching rate. That is, the mole content ratio A5 can be determined from measurement after etching for 0.8 min when the etching rate is 6.1 nm/min (value based on $SiO_2$).

When the active material contained in the battery is measured, the XPS measurement can be performed as follows.

A negative electrode is taken out in a glove box filled with argon gas, and washed with methylethyl carbonate (MEC). After a Li salt adhering to the surface of the electrode is removed by the washing, and the electrode is dried, the sample is attached to a sample holder for XPS analysis. The sample is carried in an inactive atmosphere, for example, a nitrogen atmosphere.

The battery active material according to the present embodiment can be produced as follows, for example.

When the orthorhombic Na-containing niobium titanium composite oxide is synthesized, and the mixing ratio of starting materials is set to a ratio of each element contained in the stoichiometric amount of the intended composition, not only single-phase orthorhombic Na-containing niobium titanium composite oxide but also impurities such as $TiO_2$, may be synthesized. This is considered to be because lithium and sodium are evaporated and lost by a heat treatment. Particularly, lithium has a profound effect on battery characteristics caused by the loss.

Then, the amount of lithium and the like which is mixed as a starting material is conventionally set to be more than the stoichiometric proportion. However, in such a method, lithium which does not contribute to the synthesis even if a heat treatment is performed may remain. The excessive lithium which has not contributed to the synthesis may be present as impurities in the surface of the particle without being taken into the crystal phase of the intended composition. When the excessive lithium is present as impurities in the surface of the particle, an electrolyte decomposition reaction in the surface of the particle is caused by lithium, which may cause an increase in interface resistance between the electrode and the electrolyte.

As a result of the extensive studies based on the findings, the present inventors found that the nonaqueous electrolyte decomposition reaction can be suppressed by removing the excessive lithium which is present in the surface of the active material particles after the heat treatment. The suppression of the side reaction provides an improvement in the life characteristics. The resistance can be reduced, which provides an improvement in the rate characteristics.

In the above, the case where the mixing ratio of starting materials is set to be more than the stoichiometric proportion of the intended composition has been described, but the mixing ratio of the starting materials may be the same as the stoichiometric proportion of the intended composition. Also in this case, lithium which is not taken into the crystal phase of the intended composition may be present after the heat treatment, and thereby the life characteristics are improved by removing such lithium.

The orthorhombic Na-containing niobium titanium composite oxide can be synthesized by a solid-phase method, for example. Alternatively, the orthorhombic Na-containing niobium titanium composite oxide can also be synthesized by a wet synthesizing method such as a sol gel method or a hydrothermal method. According to the wet synthesizing method, fine particles can be easily obtained as compared with the solid-phase method.

Hereinafter, an example of a method for synthesizing the orthorhombic Na-containing niobium titanium composite oxide according to the solid-phase method will be described.

First, according to the intended composition, among a Ti source, a Li source, a Na source, a Nb source, a metal element M1 source, and a metal element M2 source, required starting materials are prepared. These starting materials may be an oxide or a compound salt, for example. The above salt is preferably a salt such as a carbonate and nitrate, which is decomposed at a relatively low temperature to form an oxide.

Next, the prepared starting materials are mixed in a suitable stoichiometric proportion, to obtain a mixture. When the orthorhombic Na-containing niobium titanium composite oxide represented by the composition formula $Li_2Na_{1.7}Ti_{5.7}Nb_{0.3}O_{14}$ is synthesized, for example, titanium oxide $TiO_2$, lithium carbonate $Li_2CO_3$, sodium carbonate $Na_2CO_3$, and niobium hydroxide $Nb(V)(OH)_5$ are mixed in such a manner that the molar ratio of Li:Na:Ti:Nb in a mixture is set to 2:1.7:5.7:0.3. However, Li and Na may be lost by the heat treatment as described above, and thereby Li and Na may be mixed in such a manner that the molar ratio thereof is more than the stoichiometric proportion of the intended composition. Particularly, Li may be lost during the heat treatment, which is a problem. Li may be mixed in such a manner that the molar ratio thereof is more than the stoichiometric proportion of the intended composition.

The starting materials are preferably mixed after the starting materials are sufficiently pulverized. By mixing the sufficiently pulverized starting materials, the starting materials easily react with each other, which can suppress the generation of impurities.

Next, the mixture obtained by the previous mixing is subjected to a heat treatment in an air atmosphere at a temperature of 800° C. to 1000° C. for 1 hour to 24 hours. The mixture may not be sufficiently crystallized at a temperature of lower than 800° C. The particle growth may excessively advance at a temperature of higher than 1000° C. to form coarse particles, which is not preferable. The heat treatment time of shorter than 1 hour may not provide sufficient crystallization. The heat treatment time of longer than 24 hours may cause the excessive advance of the particle growth to form coarse particles, which is not preferable.

This heat treatment is preferably performed for 2 hours to 5 hours at a temperature of 850° C. to 950° C. Thus, the orthorhombic Na-containing niobium titanium composite oxide can be obtained. After the obtained orthorhombic Na-containing niobium titanium composite oxide is collected, an annealing treatment may be performed.

For example, the orthorhombic Na-containing niobium titanium composite oxide represented by the composition formula $Li_2Na_{1.7}Ti_{5.7}Nb_{33}O_{14}$ can be obtained by subjecting the mixture obtained by mixing the starting materials as described above to a heat treatment in an air atmosphere at 900° C. for 3 hours.

Next, the orthorhombic Na-containing niobium titanium composite oxide obtained by the heat treatment is pulverized by a wet ball mill using an aqueous solution, for example, to wash the surface of the active material particles. By this washing, excessive lithium adhering to the surface of the active material particles can be flushed. As the aqueous solution, an acid aqueous solution can be used, for example. The acid aqueous solution is an aqueous solution containing chloride and sulfuric acid and the like, for example. Water may be used in place of the aqueous solution. Since the pH is increased by the excessive lithium of the surface of the particle, the acid aqueous solution is preferably used in order to provide sufficient washing.

The washing can be performed by immersing the orthorhombic Na-containing niobium titanium composite oxide in the aqueous solution without being pulverized.

Then, the washed active material particles are subjected to a reheat treatment. The composition near the surface of the active material particles may be crystallized by the reheat treatment. The temperature of the reheat treatment is 500° C. to 900° C., for example, and preferably 600° C. to 700° C. When the temperature of the reheat treatment is lower than 500° C., the crystallinity of the surface of the particle may be poor. When the temperature of the reheat treatment is higher than 900° C., the particle growth may be caused.

According to the first embodiment, a battery active material is provided. This battery active material contains active material particles containing orthorhombic Na-containing niobium titanium composite oxide. In the battery active material, a mole content ratio A5 of Li to Ti and Nb at a depth of 5 nm from a surface of the active material particles with respect to a mole content ratio A0 of Li to Ti and Nb at the surface of the active material particles, obtained by X-ray photoelectron spectroscopy measurement satisfies the following formula (1).

$$1 \leq A5/A0 \tag{1}$$

As a result, the side reaction can be suppressed, which can provide the battery active material which can achieve the nonaqueous electrolyte battery having excellent life characteristics.

Second Embodiment

According to a second embodiment, a nonaqueous electrolyte battery is provided. This nonaqueous electrolyte battery includes a positive electrode, a negative electrode containing the active material according to the first embodiment, and a nonaqueous electrolyte. The nonaqueous electrolyte battery may further include a separator, a container member, a positive electrode terminal, and a negative electrode terminal.

The positive electrode and the negative electrode can constitute an electrode group while interposing a separator between the positive electrode and the negative electrode. The nonaqueous electrolyte can be held by the electrode group. The container member can accommodate the electrode group and the nonaqueous electrolyte. The positive electrode terminal can be electrically connected to the positive electrode. The negative electrode terminal can be electrically connected to the negative electrode.

Hereinafter, the positive electrode, the negative electrode, the nonaqueous electrolyte, the separator, the container member, the positive electrode terminal, and the negative electrode terminal will be described in detail.

1) Positive Electrode

This positive electrode includes a positive electrode current collector and a positive electrode active material-containing layer supported on one or both surfaces of the positive electrode current collector and containing active material particles, a conductive agent, and a binder.

The positive electrode current collector is preferably an aluminum foil or an aluminum alloy foil containing at least one element selected from Mg, Ti, zn, Mn, Fe, Cu, and Si.

The thicknesses of the aluminum foil and aluminum alloy foil are preferably 20 µm or less, for example, and more preferably 15 µm or less. The purity of the aluminum foil is preferably 99% by mass or more. As the aluminum alloy, an alloy containing an element such as magnesium, zinc, or silicon is preferable. On the other hand, the content of transition metals such as iron, copper, nickel, and chromium is preferably 1% or less.

As the positive electrode active material, compounds capable of inserting and extracting lithium can be used. Specific examples thereof include at least one selected from manganese dioxide ($MnO_2$), iron oxide, copper oxide, nickel oxide, lithium manganese composite oxides (e.g., $Li_xMn_{2-y}M_yO_4$ or $Li_xMn_{1-y}M_yO_2$), lithium nickel composite oxides (e.g., $Li_xNi_{1-x}M_yO_2$), lithium cobalt composite oxides (e.g., $Li_xCo_{1-y}M_yO_2$), lithium nickel cobalt composite oxides (e.g., $Li_xNi_{1-y-z}Co_yM_zO_2$), lithium manganese cobalt composite oxides (e.g., $Li_xMn_{1-y-z}Co_yM_zO_2$), lithium nickel cobalt manganese composite oxides (e.g., $LiNi_{1-y-z}Co_yMn_zO_2$), lithium nickel cobalt aluminum composite oxides (e.g., $LiNi_{1-y-z}Co_yAl_zO_2$), spinel lithium manganese nickel composite oxides (e.g., $Li_xMn_{2-y}Ni_yO_4$), olivine lithium phosphorus oxides (e.g., $Li_xFePO_4$, $Li_xMnPO_4$, $Li_xMn_{1-y}Fe_yPO_4$, $Li_xCoPO_4$, $LiMn_{1-y-z}Fe_yM_zPO_4$), iron sulfate [$Fe_2(SO_4)_3$], and vanadium oxides (e.g., $V_2O_5$). In the above, $0<x\leq1$, $0\leq y\leq1$, and $0\leq z\leq1$ are preferably set. In the above, M is at least one element selected from the group consisting of Mg, Ca, Al, Ti, Zn, and Zr. One sort of these positive electrode active materials may be used alone or two sorts or more may be used in combination.

Among these, it is preferred to use at least one selected from lithium manganese composite oxides ($Li_xMn_{2-y}M_yO_4$), lithium cobalt composite oxides ($Li_xCo_{1-y}M_yO_2$), lithium nickel cobalt composite oxides (e.g., $Li_xNi_{1-y-z}Co_yM_zO_2$), lithium manganese cobalt composite oxides (e.g., $Li_xMn_{1-y-z}Co_yM_zO_2$), lithium nickel cobalt manganese composite oxides (e.g., $LiNi_{1-y-z}Co_yMn_zO_2$), and olivine lithium phosphorus oxides (e.g., $Li_xFePO_4$, $Li_xMnPO_4$, $Li_xMn_{1-y}Fe_yPO_4$, $Li_xCoPO_4$, $LiMn_{1-y-z}Fe_yM_zPO_4$). In the above, $0<x\leq1$, $0\leq y\leq1$, and $0\leq z\leq1$ are preferably set.

The use of the lithium cobalt composite oxides provides excellent rate characteristics, which is preferable. The use of the lithium nickel cobalt manganese composite oxides can provide a high energy density and excellent life characteristics, which is preferable. The spinel lithium manganese composite oxides provide an excellent life and excellent rate characteristics, which are preferable. The olivine lithium manganese iron composite phosphate compounds provide excellent life characteristics, and particularly excellent life characteristics at high temperatures, which are preferable.

The conductive agent is as necessary blended to improve the current collection performance, and suppress the contact resistance between the active material and current collector. Examples of the conductive agent include carbonaceous substances such as acetylene black, Ketjen black, graphite, and/or coke. As the conductive agent, these carbonaceous substances may be used singly, or in combination of two or more thereof.

The binder has a function of binding the active material, the conductive agent, and the current collector. As the binder, for example, at least one selected from the group consisting of polytetrafluoroethylene (PTFE), polyvinylidene fluoride (PVdF), and a cellulose-based binder such as sodium carboxymethyl cellulose (CMC), fluorine-based rubber, styrene butadiene rubber, an acrylic resin or its copolymer, polyacrylic acid, and polyacrylonitrile can be used, but the binder is not limited thereto.

It is preferable that the total amount of the positive electrode active material and lithium-inserting substance, the amount of the conductive agent, and the amount of the binder are respectively 80% by mass to 95% by mass, 3% by mass to 18% by mass, and 2% by mass to 17% by mass. When the content of the conductive agent is 3% by mass or more, the above-described effects can be achieved. By setting the amount of the conductive agent to 18% by mass or less, the decomposition of a nonaqueous electrolyte on the surface of the conductive agent in high-temperature storage can be reduced. When the binder content is 2% by mass or more, sufficient electrode strength is achieved. By setting the amount of the binder to 17% by mass or less, the content of the binder as an insulating material in the positive electrode can be reduced in such a manner that internal resistance can be reduced.

The positive electrode can be produced as follows, for example. First, the above-mentioned positive electrode active material, conductive agent, and binder are prepared. Next, these are suspended in a suitable solvent to produce a suspension. This suspension is applied to one or both surfaces of a current collector such as an aluminum foil, and dried. A positive electrode is produced by pressing the current collector after drying the suspension. The obtained positive electrode is a belt-like electrode, for example. The positive electrode may be produced by forming a positive electrode active material, a conductive agent, and a binder in pellets to produce a positive electrode active material-containing layer, and placing it on a current collector.

2) Negative Electrode

A negative electrode includes a negative electrode current collector and a negative electrode active material-containing layer supported on one or both surfaces of the negative electrode current collector and containing active material particles, a conductive agent, and a binder.

The negative electrode current collector is preferably an aluminum foil or an aluminum alloy foil containing at least one element selected from Mg, Ti, Zn, Mn, Fe, Cu, and Si. The thicknesses of the aluminum foil and aluminum alloy foil are preferably 20 μm or less, and more preferably 15 μm or less. The purity of the aluminum foil is preferably 99% by mass or more. As the aluminum alloy, an alloy containing an element such as magnesium, zinc, or silicon is preferable. On the other hand, the content of a transition metal such as iron, copper, nickel, or chromium is preferably set to 1% by mass or less.

As the negative electrode active material, the battery active material described in the first embodiment is used.

The negative electrode active material may contain other negative electrode active material. As the other negative electrode active material, titanium oxide can be used, for example. The titanium oxide is not particularly limited as long as lithium can be inserted in and be extracted from. For example, spinel lithium titanate, ramsdellite lithium titanate, titanium niobium composite oxide, titanium-containing metal composite oxide, niobium oxide and its composite oxide, titanium dioxide having a monoclinic crystal structure ($TiO_2$ (B)), and anatase titanium dioxide and the like can be used.

Examples of the spinel lithium titanate include $Li_{4+x}Ti_5O_{12}$ (x is varied in a range of $-1 \leq x \leq 3$ by a charge/discharge reaction). Examples of the ramsdellite lithium titanate include $Li_{2+y}Ti_3O_7$ (y is varied in a range of $-1 \leq y \leq 3$ by a charge/discharge reaction). Examples of $TiO_2$ (B) and anatase titanium dioxide include $Li_{1+z}TiO_2$ (z is varied in a range of $-1 \leq z \leq 0$ by a charge/discharge reaction).

The titanium niobium composite oxide contains a compound group represented by $Li_xTi_{1-y}M1_yNb_{2-z}M2_zO_7$, for example. Here, x is a value varied in a range of $0 \leq x \leq 5$ by a charge/discharge reaction. M1 is at least one selected from the group consisting of Zr, Si, and Sn; M2 is at least one selected from the group consisting of V, Ta, and Bi; y is a value satisfying $0 \leq y < 1$; and z is a value satisfying $0 \leq z \leq 2$.

Examples of the titanium-containing metal composite oxide include metal composite oxides containing Ti and at least one element selected from the group consisting of P, V, Sn, Cu, Ni, and Fe. Examples of the metal composite oxides containing Ti and at least one element selected from the group consisting of P, V, Sn, Cu, Ni, and Fe include $TiO_2$—$P_2O_5$, $TiO_2$—$V_2O_5$, $TiO_2$—$P_2O_5$—$SnO_2$, and $TiO_2$—$P_2O_5$-MeO (Me is at least one element selected from the group consisting of Cu, Ni, and Fe).

Preferably, this metal composite oxide has a low crystallinity and is in the state of a microstructure in which crystal phases coexist with amorphous phases, or amorphous phases exist alone. Such a microstructure can further improve the cycle performance.

The conductive agent is as necessary blended to improve the current collection performance, and suppress the contact resistance between the active material and current collector. Examples of the conductive agent include carbonaceous substances such as acetylene black, Ketjen black, graphite, and/or coke. As the conductive agent, these carbonaceous substances may be used singly, or in combination of two or more thereof.

The binder has a function of binding the active material, the conductive agent, and the current collector. As the binder, for example, at least one selected from the group consisting of polytetrafluoroethylene (PTFE), polyvinylidene fluoride (PVdF), and a cellulose-based binder such as sodium carboxymethyl cellulose (CMC), fluorine-based rubber, styrene butadiene rubber, an acrylic resin or its copolymer, polyacrylic acid, and polyacrylonitrile can be used, but the binder is not limited thereto.

The contents of the negative electrode active material, conductive agent and binder are preferably 70% by mass to 96% by mass, 2% by mass to 28% by mass or less, and 2% by mass to 28% by mass, respectively. When the content of the conductive agent is 2% by mass or more, the above-described effects can be achieved. From the viewpoint of increasing the capacity, the contents of the conductive agent and binder are preferably 28% by mass or less respectively.

The negative electrode can be produced as follows, for example. First, the above-mentioned negative electrode active material, conductive agent, and binder are prepared. Next, these are suspended in a suitable solvent to produce a suspension. When a stirring speed is excessively high in this case, secondary particles may collapse, and thereby, the stirring speed is preferably comparatively low. This suspension is applied to one or both surfaces of a current collector such as an aluminum foil, and dried. A negative electrode is produced by pressing the current collector after drying the suspension.

The obtained negative electrode is a belt-like electrode, for example. The negative electrode may be produced by forming a negative electrode active material, a conductive agent, and a binder in pellets to produce a negative electrode active material-containing layer, and placing it on a current collector.

3) Nonaqueous Electrolyte

The nonaqueous electrolyte may be, for example, a liquid nonaqueous electrolyte prepared by dissolving an electrolyte in an organic solvent or a gel nonaqueous electrolyte in which a liquid electrolyte and a polymeric material are compounded. The nonaqueous electrolyte may contain an additive.

For the liquid nonaqueous electrolyte, an electrolyte is preferably dissolved at a concentration of 0.5 mol/L to 2.5 mol/L in an organic solvent.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsufonylimide [$LiN(CF_3SO_2)_2$], or mixtures thereof. The electrolyte is preferably unlikely to be oxidized even at high potentials, and $LiPF_6$ is most preferred.

Examples of the organic solvent include cyclic carbonates such as propylene carbonate (PC), ethylene carbonate (EC), and vinylene carbonate, chain-like carbonates such as diethyl carbonate (DEC), dimethyl carbonate (DMC), and methyl ethyl carbonate (MEC), cyclic ethers such as tetrahydrofuran (THF), 2-methyltetrahydrofuran (2MeTHF), dioxolan (DOX), chain-like ethers such as dimethoxyethane (DME) and diethoxyethane (DEE), and γ-butyrolactone (GBL), acetonitrile (AN), and sulfolane (SL). These organic solvents can be used singly, or in the form of a mixed solvent.

The organic solvent is preferably a mixed solvent obtained by mixing at least two or more selected from the group consisting of propylene carbonate (PC), ethylene carbonate (EC), diethyl carbonate (DEC), dimethyl carbonate (DMC), and methylethyl carbonate (MEC). Cyclic carbonate is preferable because a dissociation degree of lithium salt in cyclic carbonate is high. Since chain carbonate provides an electrolyte solution having a low viscosity, lithium is likely to diffuse, which is preferable. The mixed solvent can achieve both the characteristics of the cyclic carbonate and the characteristics of the chain carbonate, which is preferable.

Examples of the polymer material include polyvinylidene fluoride (PVdF), polyacrylonitrile (PAN), and polyethylene oxide (PEO).

Alternatively, an ambient temperature molten salt (ionic melt) containing lithium ion, a polymer solid electrolyte, an inorganic solid electrolyte, or the like may be used for the nonaqueous electrolyte.

The ambient temperature molten salt (ionic melt) refers to a compound that can be present as a liquid at an ambient temperature (15 to 25° C.), among organic salts of combinations of an organic cation and anion. Examples of the ambient temperature molten salt include ambient temperature molten salts that are themselves present as liquids, ambient temperature molten salts that turn into liquids by mixing with an electrolyte, and ambient temperature molten salts that turn into liquids by dissolution in an organic solvent. In general, the ambient temperature molten salts for use in nonaqueous electrolyte batteries have a melting point of 25° C. or lower. In addition, the organic cation typically has a quaternary ammonium skeleton.

The polymer solid electrolyte is prepared by dissolving an electrolyte in a polymer material, followed by solidification.

The inorganic solid electrolyte refers to a solid substance that has lithium ion conductivity.

4) Separator

The separator is disposed between the positive electrode and negative electrode.

For example, a porous film or synthetic resin nonwoven fabric containing at least one selected from the group consisting of polyethylene, polypropylene, polyethylene terephthalate, cellulose, and polyvinylidene fluoride (PVdF) can be used for the separator. Alternatively, a separator obtained by applying an inorganic compound to the porous film can be used.

5) Container Member

As the container member, for example, a laminated film or a metal container can be used.

Examples of the shape of the container member include a flat-type (thin type), a rectangular type, a cylindrical type, a coin type, a button type, a sheet type, and a laminated type. The container member may have a size depending on the size of the battery. The container member has a size used for a small battery which is loaded into a portable electronic device, and a large battery which is loaded into a vehicle such as a two- or four-wheeled automobile.

The laminated film used is a multilayer film including resin films and a metal layer interposed between the resin films. The thickness of the laminated film is preferably 0.2 mm or less. The metal layer is preferably an aluminum foil or an aluminum alloy foil for reducing the weight. The resin film may be, for example, a polymeric material such as polypropylene (PP), polyethylene (PE), nylon, or polyethylene terephthalate (PET). The laminated film may be heat-sealed to be formed into the shape of the container member.

The metal container has a thickness of, preferably 0.5 mm or less, and more preferably 0.2 mm or less.

The metal container is made of aluminum or an aluminum alloy, for example. The aluminum alloy preferably contains an element such as magnesium, zinc, or silicon. If a transition metal such as iron, copper, nickel, or chromium is contained in the alloy, the content thereof is preferably set to 100 ppm or less. Thus, the long-term reliability in the hot environment and heat-releasing property can be dramatically improved.

6) Positive Electrode Terminal

The positive electrode terminal may be made of, for example, a material which is electrically stable and has electrical conductivity in the potential range of 3 V to 4.5 V (vs $Li/Li^+$) for lithium. Specific examples thereof include aluminum or an aluminum alloy containing an element such as Mg, Ti, Zn, Mn, Fe, Cu, or Si. The same material as that of the positive electrode current collector is preferable in order to reduce the contact resistance.

7) Negative Electrode Terminal

The negative electrode terminal may be made of, for example, a material which is electrically stable and has electrical conductivity in the potential range of 0.4 V to 3 V (vs $Li/Li^+$) for lithium. Specific examples thereof include aluminum or an aluminum alloy containing an element such as Mg, Ti, Zn, Mn, Fe, Cu, or Si. The same material as that of the negative electrode current collector is preferable in order to reduce the contact resistance.

Next, some examples of the nonaqueous electrolyte battery according to the present embodiment will be described with reference to the drawings.

First, a flat-type nonaqueous electrolyte battery as an example of the nonaqueous electrolyte battery according to the present embodiment will be described with reference to FIGS. 1 and 2.

FIG. 1 is a schematic cross-sectional view showing an example of a flat-type nonaqueous electrolyte battery according to the present embodiment. FIG. 2 is an enlarged cross-sectional view of a part A of FIG. 1.

Figure 2:
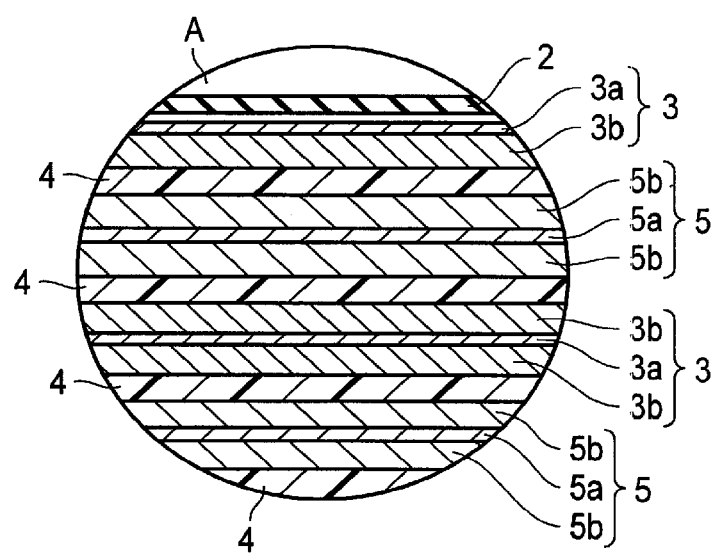
FIG. 2 shows an enlarged cross-sectional view of a part A of FIG. 1.

A nonaqueous electrolyte battery 10 shown in FIGS. 1 and 2 includes a flat-type wound electrode group 1.

As shown in FIG. 2, the flat-type wound electrode group 1 includes a negative electrode 3, a separator 4, and a positive electrode 5. The separator 4 is interposed between the negative electrode 3 and the positive electrode 5. The flat-type wound electrode group 1 can be formed by, as shown in FIG. 2, spiraling a laminated product which is obtained by laminating a negative electrode 3, a separator 4, and a positive electrode 5 with the negative electrode 3 located outside, and then press-forming the spiral. This laminated product is laminated in such a manner that the separator 4 is interposed between the negative electrode 3 and the positive electrode 5.

The negative electrode 3 includes a negative electrode current collector 3a and a negative electrode active material-containing layer 3b. The outermost negative electrode 3 has a structure as shown in FIG. 2, which includes a negative electrode active material-containing layer 3b formed on only the inside surface of the negative electrode current collector 3a. The other negative electrode 3 includes a negative electrode active material-containing layer 3b formed on each surface of the negative electrode current collector 3a.

The positive electrode 5 includes a positive electrode active material-containing layer 5b formed on each surface of a positive electrode current collector 5a.

As shown in FIGS. 1 and 2, near the outer peripheral edge of the wound electrode group 1, a negative electrode terminal 6 is connected to the negative electrode current collector 3a in the outermost negative electrode 3, and a positive electrode terminal 7 is connected to the positive electrode current collector 5a in the inside positive electrode 5.

The wound electrode group 1 is accommodated in a baggy container 2 made of a laminated film obtained by interposing a metal layer between two resin layers.

The negative electrode terminal 6 and the positive electrode terminal 7 are externally extended from an opening part of the baggy container 2. For example, a liquid nonaqueous electrolyte is, for example, injected from the opening part of the baggy container 2, and is accommodated in the baggy container 2.

The wound electrode group 1 and the liquid nonaqueous electrolyte are completely sealed by heat-sealing the opening part of the baggy container 2, and sandwiching the negative electrode terminal 6 and the positive electrode terminal 7 in between.

Next, another example of the nonaqueous electrolyte battery according to the present embodiment will be described with reference to FIGS. 3 and 4.

FIG. 3 is a cutaway perspective view schematically showing another example of a nonaqueous electrolyte battery according to the present embodiment. FIG. 4 is a schematic cross-sectional view of a part B of FIG. 3.

The nonaqueous electrolyte battery 10 shown in FIGS. 3 and 4 includes a stacked electrode group 11. As shown in FIG. 3, the stacked electrode group 11 is housed in a container member 12 of a laminate film with a metallic layer interposed between two resin films. As shown in FIG. 4, the stacked electrode group 11 has a structure obtained by alternately stacking positive electrodes 13 and negative electrodes 14 with separators 15 interposed therebetween. There are a plurality of positive electrodes 13, each including a positive electrode current collector 13a and a positive electrode active material-containing layer 13b supported on both sides of the positive electrode current collector 13a. There are a plurality of negative electrodes 14, each including a negative electrode current collector 14a and a negative electrode active material containing layer 14b supported on both sides of the negative electrode current collector 14a. The negative electrode current collector 14a of each negative electrode 14 has a side protruded from the negative electrode 14. The protruded negative electrode current collector 14a is electrically connected to a strip negative electrode terminal 16. The strip negative electrode terminal 16 has an end extended from the container member 12 to the outside. In addition, although not shown, the positive electrode current collector 13a of the positive electrode 13 has a side located on the side opposite to the protruded side of the negative electrode current collector 14a, which is protruded from the positive electrode 13. Although also not shown, the positive electrode current collector 13a protruded from the positive electrode 13 is electrically connected to a strip positive electrode terminal 17. The strip positive electrode terminal 17 has an end located on the side opposite to the negative electrode terminal 16, and extended from a side of the container member 12 to the outside.

The nonaqueous electrolyte battery according to the second embodiment contains the battery active material according to the first embodiment. Therefore, the side reaction can be suppressed, which can provide the nonaqueous electrolyte battery having excellent life characteristics.

Third Embodiment

According to a third embodiment, a battery pack is provided. This battery pack includes the nonaqueous electrolyte battery according to the second embodiment.

The battery pack according to the present embodiment may include one nonaqueous electrolyte battery, and may include a plurality of nonaqueous electrolyte batteries. The plurality of nonaqueous electrolyte batteries which may be included in the battery pack can be electrically connected in series, in parallel, or in combination of series and parallel. The plurality of nonaqueous electrolyte batteries can be electrically connected to constitute a battery module. The battery pack may include a plurality of battery modules.

The battery pack according to the third embodiment may further comprise a protective circuit. The protective circuit has a function to control charging and discharging of the nonaqueous electrolyte battery. Alternatively, a circuit included in equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output the current from the nonaqueous electrolyte battery, and to input the current to the nonaqueous electrolyte battery. In other words, when the battery pack is used as a power source, the current is externally provided via the external power distribution terminal. Also, when the battery pack is charged, the charging current (including regenerative energy caused by power of vehicles such as automobiles) is provided to the battery pack via the external power distribution terminal.

Next, an example of a battery pack according to the present embodiment will be described with reference to the drawings.

Figure 5:
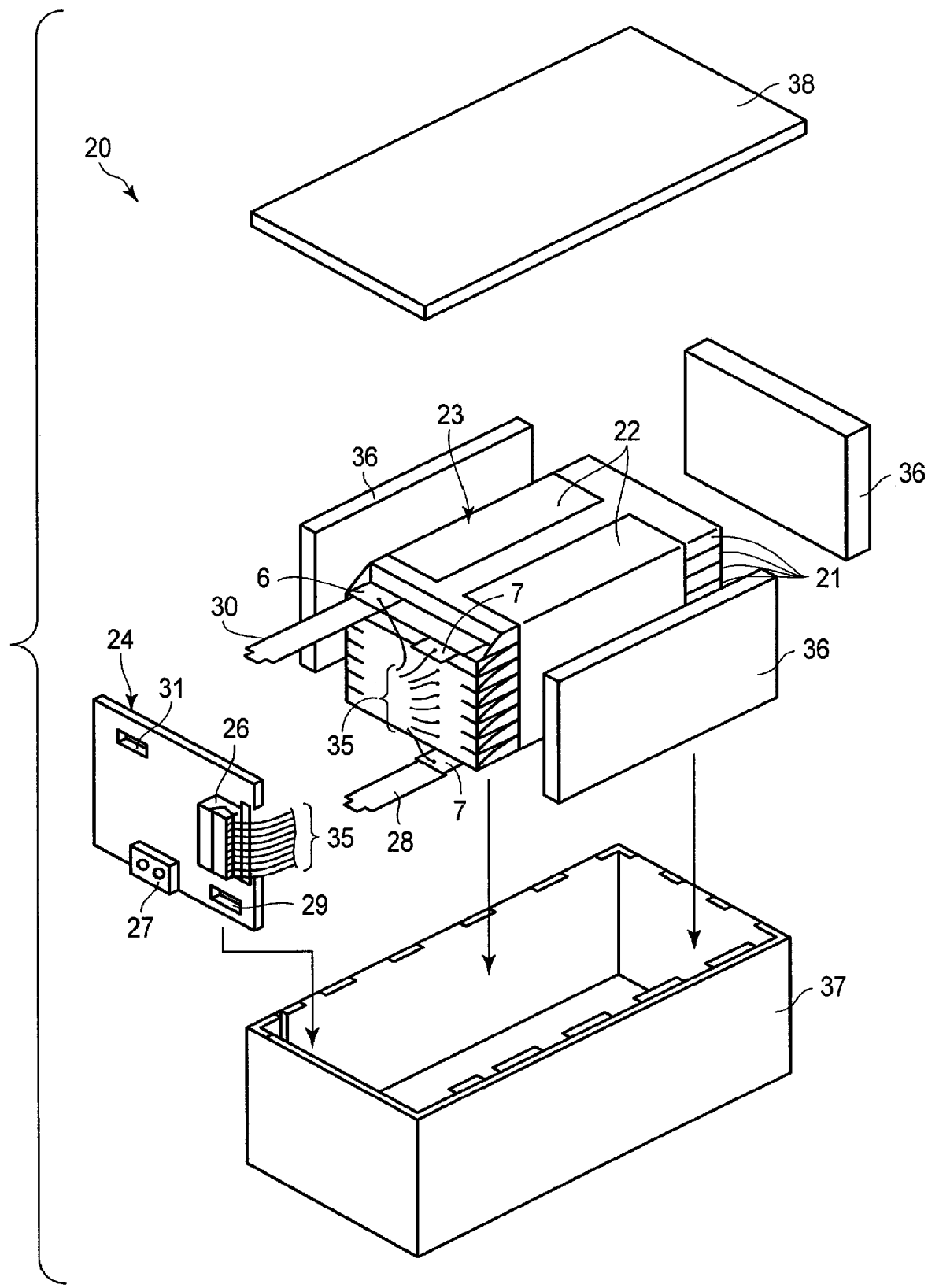
FIG. 5 shows an exploded perspective view showing an example of a battery pack according to a third embodiment.
Figure 6:
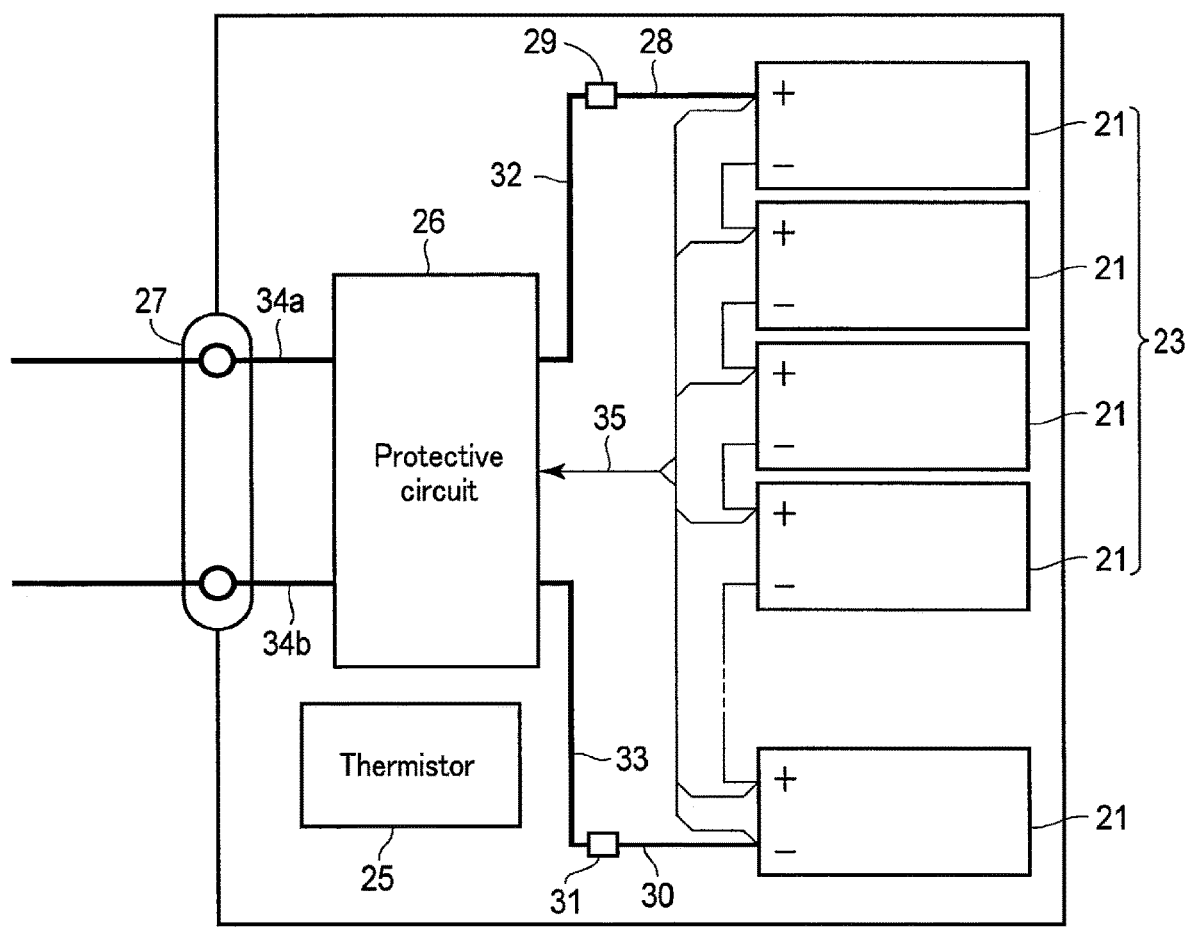
FIG. 6 is a block diagram showing an electric circuit of the battery pack of FIG. 5.

FIG. 5 is an exploded perspective view showing an example of the battery pack according to the present embodiment. FIG. 6 is a block diagram showing an electric circuit of the battery pack shown in FIG. 5.

A battery pack 20 shown in FIGS. 5 and 6 includes a plurality of flat-type unit cells 21 having a structure shown in FIGS. 1 and 2.

The plurality of unit cells 21 compose a battery module 23, wherein the negative electrode terminals 6 and positive electrode terminals 7 extending out are laminated in the same direction, and bound together by an adhesive tape 22, thereby constituting a battery module 23. These unit cells 21 are electrically connected to each other in series, as shown in FIG. 6.

A printed wiring board 24 is opposed to side surfaces of the plurality of unit cells 21 from which the negative electrode terminal 6 and positive electrode terminal 7 are extended. On the printed wiring board 24, as shown in FIG. 6, a thermistor 25, a protective circuit 26, and an energizing terminal 27 for the external device are mounted. An insulating plate (not shown) is mounted on the printed wiring board 24 on the side opposed to the battery module 23, so as to avoid unnecessary connection to the wiring of the battery module 23.

A positive electrode lead 28 is connected to the positive electrode terminal 7 of the unit cell 21 located in the lowest layer of the battery module 23, and the tip is inserted into and electrically connected to a positive electrode connector 29 on the printed wiring board 24. A negative electrode lead 30 is connected to the negative electrode terminal 6 of the unit cell 21 located in the uppermost layer of the battery module 23, and the tip is inserted into and electrically connected to the negative electrode connector 31 on the printed wiring board 24. These connectors 29 and 31 are connected to the protective circuit 26 through the wirings 32 and 33 formed on the printed wiring board 24.

The thermistor 25 detects the temperature of each of the unit cells 21, and the detection signal is sent to the protective circuit 26. The protective circuit 26 can break the positive side wiring 34a and the negative side wiring 34b between the protective circuit 26 and the energizing terminal 27 for the external device under a predetermined condition. Examples of the predetermined condition include the case where a signal showing that the temperature of the unit cell 21 is not less than a predetermined temperature is received from the thermistor 25. Another example of the predetermined condition is the case of detecting over-charge, over-discharge, over-current and the like of the unit cell 21. The detection of the over-charge and the like is performed for each of the respective unit cells 21 or the battery module 23. When each of the unit cells 21 is detected, the battery voltage may be detected, or the positive or negative electrode potential may be detected. In the latter case, a lithium electrode used as a reference electrode is inserted into each of the unit cells 21. In the case of the battery pack shown in FIGS. 5 and 6, wiring 35 for voltage detection is connected to each of the unit cells 21, and the detection signal is sent to the protective circuit 26 through the wiring 35.

Among the four side surfaces of the battery module 23, a protective sheet 36 made of rubber or resin is placed on each of the three side surfaces of the battery module 23 excluding the side surface from which the positive electrode terminal 7 and negative electrode terminal 6 are protruded.

The battery module 23 is accommodated in an accommodating container 37 together with the protective sheet 36 and the printed wiring board 24. The protective sheet 36 is disposed on each inside surface in the direction of the long side and on one of the inside surfaces in the direction of the short side of the accommodating container 37. The printed wiring board 24 is disposed on an opposite inside surface opposed to the inside surface in the direction of the short side of the accommodating container 37 on which the protective sheet 36 is disposed. The battery module 23 is located in the space surrounded by the protective sheets 36 and the printed wiring board 24. A lid 38 is mounted on the top surface of the accommodating container 37.

It is to be noted that for fixing the battery module 23, a heat-shrinkable tape may be used in place of an adhesive tape 22. In this case, a protective sheet is disposed on both side surfaces of the battery module 23, the heat-shrinkable tape is wrapped, and the heat-shrinkable tape is then shrunk by heat to bind the battery module.

The battery pack 20 shown in FIGS. 5 and 6 has a form in which a plurality of unit cells 21 are connected in series, but the battery pack 20 may include a plurality of unit cells 21 connected in parallel in order to increase the battery capacity. Alternatively, the battery pack 20 may include a plurality of unit cells 21 connected by combining series connection and parallel connection. The battery packs 20 may be further electrically connected in series or in parallel.

Although the battery pack 20 shown in FIGS. 5 and 6 includes the plurality of unit cells 21, the battery pack 20 may include a unit cell 21.

The embodiment of the battery pack is appropriately changed according to the application. The battery pack according to the present embodiment is suitably used for the applications where excellent life characteristics are required during drawing a large current. Specifically, the battery pack is used as a power source for digital cameras, or an on-vehicle battery for two- to four-sheet hybrid electric automobiles, two- to four-wheel electric automobiles, and electrically assisted pedal cycles. In particular, the battery pack is suitably used as the on-vehicle battery.

In a vehicle such as an automobile having the battery pack according to the third embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and electric trains.

The battery pack according to the third embodiment includes the nonaqueous electrolyte battery according to the second embodiment. Therefore, the side reaction can be suppressed, which can provide the battery pack having excellent life characteristics.

Fourth Embodiment

According to a fourth embodiment, a vehicle is provided. The vehicle includes the battery pack according to the third embodiment.

Figure 13:
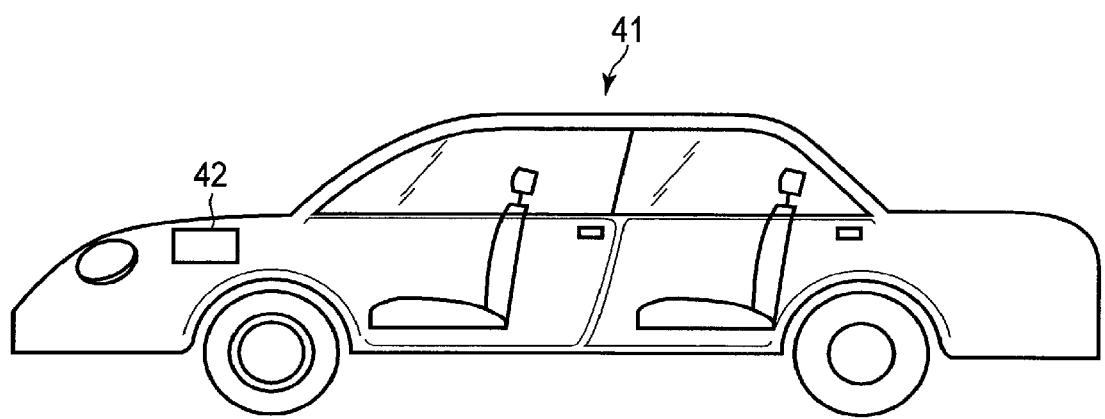
FIG. 13 shows an example of a vehicle according to a fourth embodiment.

FIG. 13 shows an example of an automobile as a vehicle which includes a battery pack according to a third embodiment.

The automobile 41 shown in FIG. 13 includes a battery pack 42 which is an example of the battery pack according to the third embodiment mounted in its engine room. The mounting position is not limited to engine rooms. For example, the battery pack may also be mounted in rear parts of automobiles or under seats.

The vehicle according to the fourth embodiment includes the battery pack according to the third embodiment. Therefore, the side reaction can be suppressed, which can provide the battery pack having excellent life characteristics.

EXAMPLES

Examples will be described below, but the embodiments are not to be considered limited to the examples described below.

Example 1

<Production of Active Material>

According to the following procedure, $Li_{2.2}Na_{1.7}Ti_{5.7}Nb_{0.3}O_{14}$ was synthesized as orthorhombic Na-containing niobium titanium composite oxide. Titanium oxide $TiO_2$, lithium carbonate $Li_2CO_3$, sodium carbonate $Na_2CO_3$, and niobium hydroxide (V) $Nb(OH)_5$ were prepared as starting materials. These starting materials were mixed in such a manner that the molar ratio of Li:Na:Ti:Nb of a mixture was set to 2.2:1.7:5.7:0.3. Prior to mixing, the starting materials were sufficiently pulverized.

The mixed starting materials were subjected to a heat treatment in an air atmosphere at 1000° C. for 10 hours. Thus, a powdered product was obtained. The obtained $Li_{2.2}Na_{1.7}Ti_{5.7}Nb_{0.3}O_{14}$ was subjected to a wet ball mill treatment in pure water for 5 hours, filtered, and then subjected to a reheat treatment. The reheat treatment was performed under conditions of 600° C. and 3 hours.

<Production of Electrode>

By mass, 90% of the active material produced above, 5% by mass of acetylene black, and 5% by mass of polyvinylidene fluoride (PVdF) were dispersed in N-methylpyrrolidone (NMP), and mixed, to prepare a slurry using a rotation/revolution mixer. This slurry was applied to both surfaces of a current collector formed of a 15-μm-thick aluminum foil and dried. The current collector was then pressed to produce an electrode having an electrode density of 2.3 g/cm³.

<Production of Evaluation Cell of Electrode>

In dry argon, an evaluation cell of an electrode was produced as follows. The electrode produced above was used as a working electrode, and a Li metal was used as a counter electrode. These were opposed to each other with a glass filter (separator) disposed therebetween, and a reference electrode made of a lithium metal was inserted in such a manner that the reference electrode did not contact the working electrode and the counter electrode.

The working electrode, the counter electrode, the reference electrode, and the glass filter were placed in a three-electrode glass cell, and the working electrode, the counter electrode, and the reference electrode were connected to terminals of the glass cell. An electrolyte solution was poured into the glass cell to attain a state in which the separator and the electrodes were sufficiently impregnated with the electrolyte solution, and then a glass container was sealed. Thus, a battery for evaluation of an electrode was produced. A mixed solvent obtained by mixing ethylene carbonate (EC) and diethyl carbonate (DEC) at a volume rate of 1:2 was used as a solvent of the electrolyte solution. $LiPF_6$ was dissolved at a concentration of 1.0 mol/L as an electrolyte in the mixed solvent to prepare an electrolyte solution.

<Charge-and-Discharge Cycle Test of Glass Cell>

A charge-and-discharge cycle test was performed at 25° C. using a battery for evaluation. The charging was performed at 1 C. Here, 1 C was set to 120 mA/g. The charging was performed in a constant current-constant voltage mode. When a voltage reached 1.1 V (vs. Li/Li$^+$), constant voltage charging was provided. When a current value reached 0.05 C, the charging was finished. The discharging was performed in a constant current mode, and the discharging rate was set to 1 C. Discharge terminated when the voltage was reached at 2 V (vs. Li/Li$^+$).

The number of cycles carried out in this test was set to 100 cycles. By dividing the discharge capacity at the 100th cycle of the three-electrode glass cell by the discharge capacity at the first cycle, the capacity retention ratio after 100 cycles at 25° C. was evaluated. The capacity retention ratio serves as an index of the cycling characteristics of the electrode, <X-Ray Photoelectron Spectroscopy (XPS) Measurement>

After the cycle test was performed, XPS measurement was performed according to the following procedure. QuanteraSXM manufactured by PHI was used as an apparatus. Single crystal spectroscopy Al—Kα (1486.6 eV) was used as an excitation X-ray source, and a photoelectron detection angle was set to 45 degrees. Ion etching was performed with Ar ions at an accelerating voltage of 2 kV, and an etching rate was set to 6.1 nm/min (value based on $SiO_2$). According to this measurement, the mole content ratio A0 of Li to Ti and Nb on a surface of active material particles, and the mole content ratio A5 of Li to Ti and Nb at a depth of 5 nm from the surface of the active material particles were determined.

Example 2

According to the following procedure, $Li_2Na_{1.9}Ti_{5.9}Nb_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb in a mixture was set to 2:1.9:5.9:0.1 when starting materials were mixed.

Example 3

According to the following procedure, $Li_{2.3}Na_{1.8}Ti_{5.9}Nb_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb in a mixture was set to 2.3:1.8:5.9:0.1 when starting materials were mixed.

Example 4

According to the following procedure, $Li_{2.2}Na_{1.5}Ti_{5.5}Nb_{0.5}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb in a mixture was set to 2.2:1.5:5.5:0.5 when starting materials were mixed.

Example 5

According to the following procedure, $Li_{2.1}Na_{1.4}Ti_{5.5}Nb_{0.5}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb in a mixture was set to 2.1:1.4:5.5:0.5 when starting materials were mixed.

Example 6

According to the following procedure, $Li_2NaTi_5NbO_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb in a mixture was set to 2:1:5:1 when starting materials were mixed.

Example 7

According to the following procedure, $Li_2NaSr_{0.5}Ti_{5.9}Nb_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, strontium nitrate $Sr(NO_3)_2$, lithium carbonate $Li_2CO_3$, sodium carbonate $Na_2CO_3$, and niobium hydroxide (V) $Nb(OH)_5$ were mixed in such a manner that the molar ratio of Li:Na:Sr:Ti:Nb of a mixture was set to 2:1:0.5:5.9:0.1 when starting materials were mixed.

Example 8

According to the following procedure, $Li_2Na_{1.5}Sr_{0.2}Ti_{5.9}Nb_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, strontium nitrate $Sr(NO_3)_2$, lithium carbonate $Li_2CO_3$, sodium carbonate $Na_2CO_3$, and niobium hydroxide (V) $Nb(OH)_5$ were mixed in such a manner that the molar ratio of Li:Na:Sr:Ti:Nb of a mixture was set to 2:1.5:0.2:5.9:0.1 when starting materials were mixed.

Example 9

According to the following procedure, $Li_2Na_{2.5}Mg_{0.2}Ti_{5.9}Nb_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, magnesium acetate $Mg(CH_3COO)_2$, lithium carbonate $Li_2CO_3$, sodium carbonate $Na_2CO_3$, and niobium hydroxide (V) $Nb(OH)_5$ were mixed in such a manner that the molar ratio of Li:Na:Mg:Ti:Nb of a mixture was set to 2:1.5:0.2:5.9:0.1 when starting materials were mixed.

Example 10

According to the following procedure, $Li_2Na_{1.5}Ba_{0.2}Ti_{5.9}Nb_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, barium carbonate $BaCO_3$, lithium carbonate $Li_2CO_3$, sodium carbonate $Na_2CO_3$, and niobium hydroxide (V) $Nb(OH)_5$ were mixed in such a manner that the molar ratio of Li:Na:Ba:Ti:Nb of a mixture was set to 2:1.5:0.2:5.9:0.1 when starting materials were mixed.

Example 11

According to the following procedure, $Li_2Na_{1.5}Ba_{0.2}Ti_{5.5}Nb_{0.5}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, barium carbonate $BaCO_3$, lithium carbonate $Li_2CO_3$, sodium carbonate $Na_2CO_3$, and niobium hydroxide (V) $Nb(OH)_5$ were mixed in such a manner that the molar ratio of Li:Na:Ba:Ti:Nb of a mixture was set to 2:1.5:0.2:5.5:0.5 when starting materials were mixed.

Example 12

According to the following procedure, $Li_2Na_{1.9}Ti_{5.7}Nb_{0.1}Al_{0.2}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, aluminum oxide $Al_2O_3$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb:Al of a mixture was set to 2:1.9:5.7:0.1:0.2 when starting materials were mixed.

Example 13

According to the following procedure, $Li_2Na_{1.9}Ti_{5.8}Nb_{0.1}Zr_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, zirconium dioxide $ZrO_2$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb:Zr of a mixture was set to 2:1.9:5.8:0.1:0.1 when starting materials were mixed.

Example 14

According to the following procedure, $Li_2Na_{1.9}Ti_{5.8}Nb_{0.1}Sn_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, tin oxide $SfO_2$, and lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb:Sn of a mixture was set to 2:1.9:5.8:0.1:0.1 when starting materials were mixed.

Example 15—Reference Example

According to the following procedure, $Li_{2.1}Na_{1.9}Ti_{5.8}Nb_{0.1}Ta_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, tantalum oxide (V) $Ta_2O_5$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb:Ta of a mixture was set to 2.1:1.9:5.8:0.1:0.1 when starting materials were mixed.

Example 16—Reference Example

According to the following procedure, $Li_{2.1}Na_{1.9}Ti_{5.8}Nb_{0.1}V_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, vanadium oxide (V)$V_2O_5$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb:V of a mixture was set to 2.1:1.9:5.8:0.1:0.1 when starting materials were mixed.

Example 17

According to the following procedure, $Li_2Na_{1.9}Ti_{5.8}Nb_{0.1}Fe_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, iron oxide (III) $Fe_2O_3$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb:Fe of a mixture was set to 2:1.9:5.8:0.1:0.1 when starting materials were mixed.

Example 18

According to the following procedure, $Li_2Na_{1.9}Ti_{5.8}Nb_{0.1}Co_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, cobalt oxide $Co_3O_4$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb:Co of a mixture was set to 2:1.9:5.8:0.1:0.1 when starting materials were mixed.

Example 19

According to the following procedure, $Li_2Na_{1.9}Ti_{5.8}Nb_{0.1}Mn_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, manganese oxide $Mn_3O_4$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb:Mn of a mixture was set to 2:1.9:5.8:0.1:0.1 when starting materials were mixed.

Example 20

According to the following procedure, $Li_2Na_{1.9}Ti_{5.8}Nb_{0.1}Mo_{0.1}O_{14}$ was synthesized as orthorhombic Na-containing niobium titanium composite oxide. Production of an electrode, production of an evaluation cell, a cycle test, and XPS measurement were performed according to the same method as that described in Example 1 except that titanium dioxide $TiO_2$, molybdenum oxide $MoO_3$, lithium carbonate $Li_2CO_3$, sodium carbonate $Na_2CO_3$, and niobium hydroxide (V) $Nb(OH)_5$ were mixed in such a manner that the molar ratio of Li:Na:Ti:Nb:Mo of a mixture was set to 2:1.9:5.8:0.1:0.1 when starting materials were mixed.

Example 21

According to the following procedure, $Li_{2.2}Na_{1.7}Ti_{5.7}Nb_{0.3}O_{14}$ was synthesized as orthorhombic Na-containing niobium titanium composite oxide. Titanium oxide $TiO_2$, lithium carbonate $Li_2CO_3$, sodium carbonate $Na_2CO_3$, and niobium hydroxide (V) $Nb(OH)_5$ were prepared when starting materials were mixed. These starting materials were mixed in such a manner that the molar ratio of Li:Na:Ti:Nb of a mixture was set to 2.2:1.7:5.7:0.3. Prior to mixing, the starting materials were sufficiently pulverized.

The mixed starting materials were subjected to a heat treatment in an air atmosphere at 1000° C. for 10 hours. Thus, a powdered product was obtained. The obtained $Li_{2.2}Na_{1.7}Ti_{5.7}Nb_{0.3}O_{14}$ was subjected to a dry ball mill treatment for 5 hours, to perform a reheat treatment. The reheat treatment was performed under conditions of 600° C. and 3 hours.

Production of an electrode, production of an evaluation cell, a cycle test, and XPS measurement for the obtained active material particles were performed according to the same method as that described in Example 1.

Example 22

According to the following procedure, $Li_{2.2}Na_{1.7}Ti_{5.7}Nb_{0.3}O_{14}$ was synthesized as orthorhombic Na-containing niobium titanium composite oxide. Titanium oxide $TiO_2$, lithium carbonate $Li_2CO_3$, sodium carbonate $Na_2CO_3$, and niobium hydroxide (V) $Nb(OH)_5$ were prepared as starting materials. These starting materials were mixed in such a manner that the molar ratio of Li:Na:Ti:Nb of a mixture was set to 2.2:1.7:5.7:0.3. Prior to mixing, the starting materials were sufficiently pulverized.

The mixed starting materials were subjected to a heat treatment in an air atmosphere at 1000° C. for 10 hours. Thus, a powdered product was obtained. The obtained $Li_{2.2}Na_{1.7}Ti_{5.7}Nb_{0.3}O_{14}$ was washed in pure water, filtered, and then subjected to a reheat treatment. The reheat treatment was performed under conditions of 600° C. and 3 hours.

Production of an electrode, production of an evaluation cell, a cycle test, and XPS measurement for the obtained active material particles were performed according to the same method as that described in Example 1.

Comparative Example 1

According to the following procedure, $Li_{2.2}Na_{1.7}Ti_{5.7}Nb_{0.3}O_{14}$ was synthesized as orthorhombic Na-containing niobium titanium composite oxide. Titanium oxide $TiO_2$, lithium carbonate $Li_2CO_3$, sodium carbonate $Na_2CO_3$, and niobium hydroxide (V) $Nb(OH)_5$ were prepared as starting materials. These starting materials were mixed in such a manner that the molar ratio of Li:Na:Ti:Nb of a mixture was set to 2.2:1.7:5.7:0.3. Prior to mixing, the starting materials were sufficiently pulverized.

The mixed starting materials were subjected to a heat treatment in an air atmosphere at 1000° C. for 10 hours. Thus, a powdered product was obtained.

Production of an electrode, production of an evaluation cell, a cycle test, and XPS measurement for the obtained active material particles were performed according to the same method as that described in Example 1.

Comparative Example 2

According to the following procedure, $Li_{2.2}Na_{1.7}Ti_{5.7}Nb_{0.3}O_{14}$ was synthesized as orthorhombic Na-containing niobium titanium composite oxide. Titanium oxide $TiO_2$, lithium carbonate $Li_2CO_3$, sodium carbonate $Na_2CO_3$, and niobium hydroxide (V) $Nb(OH)_5$ were prepared as starting materials. These starting materials were mixed in such a manner that the molar ratio of Li:Na:Ti:Nb of a mixture was set to 2.2:1.7:5.7:0.3. Prior to mixing, the starting materials were sufficiently pulverized.

The mixed starting materials were subjected to a heat treatment in an air atmosphere at 1000° C. for 10 hours. Thus, a powdered product was obtained. The obtained $Li_{2.2}Na_{1.7}Ti_{5.7}Nb_{0.3}O_{14}$ was subjected to a dry ball mill treatment for 5 hours.

Production of an electrode, production of an evaluation cell, a cycle test, and XPS measurement for the obtained active material particles were performed according to the same method as that described in Example 1.

Comparative Example 3

According to the following procedure, $Li_{2.2}Na_{1.7}Ti_{5.7}Nb_{0.3}O_{14}$ was synthesized as orthorhombic Na-containing niobium titanium composite oxide. Titanium oxide $TiO_2$, lithium carbonate $Li_2CO_3$, sodium carbonate $Na_2CO_3$, and niobium hydroxide (V) $Nb(OH)_5$ were prepared as starting materials. These starting materials were mixed in such a manner that the molar ratio of Li:Na:Ti:Nb of a mixture was set to 2.2:1.7:5.7:0.3. Prior to mixing, the starting materials were sufficiently pulverized.

The mixed starting materials were subjected to a heat treatment in an air atmosphere at 1000° C. for 10 hours. Thus, a powdered product was obtained. The obtained $Li_{2.2}Na_{1.7}Ti_{5.7}Nb_{0.3}O_{14}$ was washed in an aqueous solution, filtered, and then dried at 100° C. for 3 hours.

Production of an electrode, production of an evaluation cell, a cycle test, and XPS measurement for the obtained active material particles were performed according to the same method as that described in Example 1.

The above results are summarized in Table 1.

TABLE 1

| | Active material composition | Washing condition | Reheat treatment condition | A5/A0 | Capacity retention ratio (%) |
|---|---|---|---|---|---|
| Example 1 | $Li_{2.2}Na_{1.7}Ti_{5.7}Nb_{0.3}O_{14}$ | Wet ball mill | 600° C., 3 hours | 1.3 | 93 |
| Example 2 | $Li_2Na_{1.9}Ti_{5.9}Nb_{0.1}O_{14}$ | Wet ball mill | 600° C., 3 hours | 1.4 | 94 |
| Example 3 | $Li_{2.3}Na_{1.8}Ti_{5.9}Nb_{0.1}O_{14}$ | Wet ball mill | 600° C., 3 hours | 1.2 | 90 |
| Example 4 | $Li_{2.2}Na_{1.5}Ti_{5.5}Nb_{0.5}O_{14}$ | Wet ball mill | 600° C., 3 hours | 1.5 | 93 |
| Example 5 | $Li_{2.1}Na_{1.4}Ti_{5.5}Nb_{0.5}O_{14}$ | Wet ball mill | 600° C., 3 hours | 1.7 | 95 |
| Example 6 | $Li_2NaTi_5NbO_{14}$ | Wet ball mill | 600° C., 3 hours | 1.9 | 90 |
| Example 7 | $Li_2NaSr_{0.5}Ti_{5.9}Nb_{0.1}O_{14}$ | Wet ball mill | 600° C., 3 hours | 1.6 | 92 |
| Example 8 | $Li_2Na_{1.5}Sr_{0.2}Ti_{5.9}Nb_{0.1}O_{14}$ | Wet ball mill | 600° C., 3 hours | 1.3 | 90 |
| Example 9 | $Li_2Na_{1.5}Mg_{0.2}Ti_{5.9}Nb_{0.1}O_{14}$ | Wet ball mill | 600° C., 3 hours | 1.4 | 91 |
| Example 10 | $Li_2Na_{1.5}Ba_{0.2}Ti_{5.9}Nb_{0.1}O_{14}$ | Wet ball mill | 600° C., 3 hours | 1.3 | 90 |
| Example 11 | $Li_2Na_{1.5}Ba_{0.2}Ti_{5.5}Nb_{0.5}O_{14}$ | Wet ball mill | 600° C., 3 hours | 1.3 | 91 |
| Example 12 | $Li_2Na_{1.9}Ti_{5.7}Nb_{0.1}Al_{0.2}O_{14}$ | Wet ball mill | 600° C., 3 hours | 1.2 | 91 |
| Example 13 | $Li_2Na_{1.9}Ti_{5.8}Nb_{0.1}Zr_{0.1}O_{14}$ | Wet ball mill | 600° C., 3 hours | 1.2 | 92 |
| Example 14 | $Li_2Na_{1.9}Ti_{5.8}Nb_{0.1}Sn_{0.1}O_{14}$ | Wet ball mill | 600° C., 3 hours | 1.2 | 90 |
| Example 15 | $Li_{2.1}Na_{1.9}Ti_{5.8}Nb_{0.1}Ta_{0.1}O_{14}$ | Wet ball mill | 600° C., 3 hours | 1.1 | 89 |
| Example 16 | $Li_{2.1}Na_{1.9}Ti_{5.8}Nb_{0.1}V_{0.1}O_{14}$ | Wet ball mill | 600° C., 3 hours | 1.1 | 91 |
| Example 17 | $Li_2Na_{1.9}Ti_{5.8}Nb_{0.1}Fe_{0.1}O_{14}$ | Wet ball mill | 600° C., 3 hours | 1.3 | 89 |
| Example 18 | $Li_2Na_{1.9}Ti_{5.8}Nb_{0.1}Co_{0.1}O_{14}$ | Wet ball mill | 600° C., 3 hours | 1.3 | 90 |
| Example 19 | $Li_2Na_{1.9}Ti_{5.8}Nb_{0.1}Mn_{0.1}O_{14}$ | Wet ball mill | 600° C., 3 hours | 1.2 | 90 |
| Example 20 | $Li_2Na_{1.9}Ti_{5.8}Nb_{0.1}Mo_{0.1}O_{14}$ | Wet ball mill | 600° C., 3 hours | 1.3 | 92 |
| Example 21 | $Li_{2.2}Na_{1.7}Ti_{5.7}Nb_{0.3}O_{14}$ | Dry ball mill | 600° C., 3 hours | 1.1 | 90 |
| Example 22 | $Li_{2.2}Na_{1.7}Ti_{5.7}Nb_{0.3}O_{14}$ | Only washing | 600° C., 3 hours | 1.2 | 93 |
| Comparative Example 1 | $Li_{2.2}Na_{1.7}Ti_{5.7}Nb_{0.3}O_{14}$ | None | None | 0.67 | 85 |

TABLE 1-continued

|  | Active material composition | Washing condition | Reheat treatment condition | A5/A0 | Capacity retention ratio (%) |
|---|---|---|---|---|---|
| Comparative Example 2 | $Li_{2.2}Na_{1.7}Ti_{5.7}Nb_{0.3}O_{14}$ | Dry ball mill | None | 0.81 | 82 |
| Comparative Example 3 | $Li_{2.2}Na_{1.7}Ti_{5.7}Nb_{0.3}O_{14}$ | Only washing | 100° C., 3 hours | 0.91 | 83 |

In Table 1, the "washing condition" represents the washing condition of the active material; the "reheat treatment condition" represents the condition in the reheat treatment after washing the active material; "A0" represents the mole content ratio of Li to Ti and Nb at the surface of the active material particles; "A5" represents the mole content ratio of Li to Ti and Nb at a depth of 5 nm from the surface of the active material particles; and the "capacity retention ratio" represents the discharge capacity at the 100th cycle with respect to the discharge capacity at the first cycle, obtained by the cycle test by percentage.

From Table 1, when the wet ball mill using the aqueous solution is used, it is found that the active material which can achieve more excellent cycling characteristics than that in the case where the dry ball milling is performed is obtained. It is found that the active material which can achieve excellent cycling characteristics is obtained by only immersion in the aqueous solution without performing wet milling from the results of Example 22. It is found that the active material which can achieve excellent cycling characteristics is obtained by sufficiently performing the reheat treatment from the results of Examples and comparative Examples.

FIG. 7 shows spectrum data of a Li1S peak obtained by XPS according to Example 1. FIG. 8 shows spectrum data of a Ti2p peak obtained by XPS according to Example 1. FIG. 9 shows spectrum data of a Nb3d peak obtained by XPS according to Example 1. From FIGS. 7 to 9, the mole content ratio A0 of Li to Ti and Nb in the surface of the active material particles, and the mole content ratio A5 of Li to Ti and Nb at a depth of 5 nm from the surface of the active material particles can be determined by the following method.

A composition (atomic %) of each element is calculated by multiplying a peak area which is subtracted a background from thereof by a relative sensitivity coefficient (RSF) for the spectrum of each element. The Shirley method is used for a method for subtracting the background. Two points of the peak (starting point and terminal point) are taken, and the background is subtracted using the Shirley method. In the Ti spectrum of FIG. 8, and the Nb spectrum of FIG. 9, the peak is detected also on a low energy side in the measurement at a depth of 5 nm, because the chemical states of these elements are changed by damage due to ion etching. The peak area also includes the area of this peak detected on the low energy side. Thus, a ratio Li/(Ti+Nb) can be calculated.

FIG. 10 shows spectrum data of a Li1S peak obtained by XPS according to Comparative Example 1. FIG. 11 shows spectrum data of a Ti2p peak obtained by XPS according to Comparative Example 1. FIG. 12 shows spectrum data of a Nb3d peak obtained by XPS according to Comparative Example 1.

According to FIGS. 10 to 12, as with those described in FIGS. 7 to 9, the mole content ratio A0 of Li to Ti and Nb in the surface of the active material particles, and the mole content ratio A5 of Li to Ti and Nb at a depth of 5 nm from the surface of the active material particles can be determined.

Then, the results of the production and evaluation of the nonaqueous electrolyte battery according to the embodiment are shown.

Example 23

<Production of Positive Electrode>

90% by mass of $LiNi_{0.34}Co_{0.33}Mn_{0.33}O_2$, 3% by mass of carbon black, 3% by mass of graphite, and 4% by mass of PVdF were dispersed in N-methyl-2-pyrrolidon (NMP), and mixed, to prepare a slurry. This slurry was applied to both surfaces of a current collector formed of a 20-µm-thick aluminum foil and dried. The current collector was then pressed to produce a positive electrode having an electrode density of 3.0 g/cm³.

<Production of Negative Electrode>

According to the same method as that described in Example 1, an active material and an electrode were produced, and this electrode was used as a negative electrode.

<Production of Electrode Group>

The positive electrode, a separator, the negative electrode, and a separator were laminated in this order, and wound in a spiral form. As the separator, a 25-µm-thick porous film made of polyethylene was used. This was pressed while being heated at 80° C., to produce a flat-type electrode group having a width of 30 mm and a thickness of 3.0 mm. The obtained electrode group was accommodated in a pack made of a laminated film, and vacuum-dried at 80° C. for 24 hours. As the laminated film, a film including a 40-µm-thick aluminum foil and a polypropylene layer formed on each surface of the aluminum foil, and having a total thickness of 0.1 mm was used.

<Preparation of Nonaqueous Electrolyte>

Propylene carbonate (PC) and ethyl methyl carbonate (MEC) were mixed with each other at a ratio by volume of ½ to prepare a mixed solvent. A liquid nonaqueous electrolyte was prepared by dissolving 1M of $LiPF_6$ as an electrolyte in this mixed solvent.

<Production of Nonaqueous Electrolyte Secondary Battery>

The liquid nonaqueous electrolyte was poured into the laminated film pack accommodating the electrode group, and the pack was then completely sealed by heat sealing. Thus, a nonaqueous electrolyte secondary battery having a width of 35 mm, a thickness of 3.2 mm, and a height of 65 mm was produced.

<Charge-and-Discharge Cycle Test>

A charge-and-discharge cycle test was performed at 45° C. using the produced battery. Charging was performed in a constant current-constant voltage mode. As the charging conditions of each cycle, a charging rate was set to 1 C, and a charging voltage was set to 3.2 V (vs. Li/Li⁺). The charging was finished after 3 hours from charging start or after a current value reached 0.05 C. Discharging was performed in a constant current mode. A discharge final voltage was set to 1.8 V (vs. Li/Li$^+$). The number of cycles carried out in this cycle test was set to 200.

By dividing the discharge capacity at the 200th cycle of the battery by the discharge capacity at the first cycle, the capacity retention ratio after 200 cycles at 45° C. was evaluated.

<XPS Measurement>

After the cycle test was performed, XPS measurement was performed according to the following procedure. QuanteraSXM manufactured by PHI was used as an apparatus. Single crystal spectroscopy Al—Kα (1486.6 eV) was used as an excitation X-ray source, and a photoelectron detection angle was set to 45 degrees. Ion etching was performed with Ar ions at an accelerating voltage of 2 kV, and an etching rate was set to 6.1 nm/min (value based on $SiO_2$). According to this measurement, the mole content ratio A0 of Li to Ti and Nb on a surface of active material particles, and the mole content ratio A5 of Li to Ti and Nb at a depth of 5 nm from the surface of the active material particles were determined.

Example 24

Production of a nonaqueous electrolyte secondary battery, a cycle test, and XPS measurement were performed by the same method as that described in Example 23 except that a positive electrode was produced according to the following procedure.

By mass, 90% of $LiMn_{1.8}Al_{0.2}O_4$, 3% by mass of carbon black, 3% by mass of graphite, and 4% by mass of PVdF were dispersed in N-methyl-2-pyrrolidon (NMP), and mixed, to prepare a slurry. This slurry was applied to both surfaces of a current collector formed of a 20-μm-thick aluminum foil and dried. The current collector was then pressed to produce a positive electrode having an electrode density of 2.7 g/cm$^3$.

Example 25

Production of a nonaqueous electrolyte secondary battery, a cycle test, and XPS measurement were performed by the same method as that described in Example 23 except that a positive electrode was produced according to the following procedure.

By mass, 88% of $LiMn_{0.8}Fe_{0.15}Mg_{0.05}PO_4$, 3% by mass of carbon black, 3% by mass of graphite, and 6% by mass of PVdF were dispersed in N-methyl-2-pyrrolidon (NMP), and mixed, to prepare a slurry. This slurry was applied to both surfaces of a current collector formed of a 20-μm-thick aluminum foil and dried. The current collector was then pressed to produce a positive electrode having an electrode density of 2.0 g/cm$^3$.

Example 26

Production of a nonaqueous electrolyte secondary battery, a cycle test, and XPS measurement were performed by the same method as that described in Example 23 except that a positive electrode was produced according to the following procedure.

By mass, 90% of $LiCoO_2$, 3% by mass of carbon black, 3% by mass of graphite, and 6% by mass of PVdF were dispersed in N-methyl-2-pyrrolidon (NMP), and mixed, to prepare a slurry. This slurry was applied to both surfaces of a current collector formed of a 20-μm-thick aluminum foil and dried. The current collector was then pressed to produce a positive electrode having an electrode density of 3.0 g/cm$^3$.

Example 27

Production of a nonaqueous electrolyte secondary battery, a cycle test, and XPS measurement were performed by the same method as that described in Example 23 except that a positive electrode was produced according to the following procedure.

By mass, 70% of $LiNi_{0.34}CO_{0.33}Mn_{0.33}O_2$, 20% by mass of $LiCoO_2$, 3% by mass of carbon black, 3% by mass of graphite, and 4% by mass of PVdF were dispersed in N-methyl-2-pyrrolidon (NMP), and mixed, to prepare a slurry. This slurry was applied to both surfaces of a current collector formed of a 20-μm-thick aluminum foil and dried. The current collector was then pressed to produce a positive electrode having an electrode density of 3.0 g/cm$^3$.

Example 28

Production of a nonaqueous electrolyte secondary battery, a cycle test, and XPS measurement were performed by the same method as that described in Example 23 except that a positive electrode was produced according to the following procedure.

By mass, 70% of $LiNi_{0.34}CO_{0.33}Mn_{0.33}O_2$, 20% by mass of $LiMn_{0.8}Fe_{0.15}Mg_{0.05}PO_4$, 3% by mass of carbon black, 3% by mass of graphite, and 4% by mass of PVdF were dispersed in N-methyl-2-pyrrolidon (NMP), and mixed, to prepare a slurry. This slurry was applied to both surfaces of a current collector formed of a 20-μm-thick aluminum foil and dried. The current collector was then pressed to produce a positive electrode having an electrode density of 2.5 g/cm$^3$.

Example 29

Production of a nonaqueous electrolyte secondary battery, a cycle test, and XPS measurement were performed by the same method as that described in Example 23 except that a positive electrode was produced according to the following procedure.

By mass, 70% of $LiMn_{1.8}Al_{0.2}O_4$, 20% by mass of $LiCoO_2$, 3% by mass of carbon black, 3% by mass of graphite, and 4% by mass of PVdF were dispersed in N-methyl-2-pyrrolidon (NMP), and mixed, to prepare a slurry. This slurry was applied to both surfaces of a current collector formed of a 20-μm-thick aluminum foil and dried. The current collector was then pressed to produce a positive electrode having an electrode density of 2.7 g/cm$^3$.

Example 30

Production of a nonaqueous electrolyte secondary battery, a cycle test, and XPS measurement were performed by the same method as that described in Example 23 except that a positive electrode was produced according to the following procedure.

By mass, 70% of $LiNi_{0.8}CO_{0.1}Mn_{0.1}O_2$, 20% by mass of $LiCoO_2$, 3% by mass of carbon black, 3% by mass of graphite, and 4% by mass of PVdF were dispersed in N-methyl-2-pyrrolidon (NMP), and mixed, to prepare a slurry. This slurry was applied to both surfaces of a current collector formed of a 20-μm-thick aluminum foil and dried.

The current collector was then pressed to produce a positive electrode having an electrode density of 3.0 g/cm³.

Comparative Example 4

A negative electrode was produced by the same method as that described in Comparative Example 1, and production of a nonaqueous electrolyte secondary battery, a cycle test, and XPS measurement were performed by the same method as that described in Example 23.

The above results are summarized in Table 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The accompanying claims and their equivalents are intended to cover such forms or modifications as would fall within the scope and spirit of the inventions.

TABLE 2

| | Composition of positive electrode active material | Composition of negative electrode active material | Washing condition | Reheat treatment condition | A5/A0 | Capacity retention ratio (%) |
|---|---|---|---|---|---|---|
| Example 23 | $LiNi_{0.34}Co_{0.33}Mn_{0.33}O_2$ | $Li_{2.2}Na_{1.7}Ti_{5.7}Nb_{0.3}O_{14}$ | Wet ball mill | 600° C., 3 hours | 1.2 | 91 |
| Example 24 | $LiMn_{1.8}Al_{0.2}O_4$ | $Li_{2.2}Na_{1.7}Ti_{5.7}Nb_{0.3}O_{14}$ | Wet ball mill | 600° C., 3 hours | 1.2 | 93 |
| Example 25 | $LiMn_{0.8}Fe_{0.15}Mg_{0.05}PO_4$ | $Li_{2.2}Na_{1.7}Ti_{5.7}Nb_{0.3}O_{14}$ | Wet ball mill | 600° C., 3 hours | 1.3 | 93 |
| Example 26 | $LiCoO_2$ | $Li_{2.2}Na_{1.7}Ti_{5.7}Nb_{0.3}O_{14}$ | Wet ball mill | 600° C., 3 hours | 1.1 | 85 |
| Example 27 | $LiNi_{0.34}Co_{0.33}Mn_{0.33}O_2:LiCoO_2$ = 70:20 | $Li_{2.2}Na_{1.7}Ti_{5.7}Nb_{0.3}O_{14}$ | Wet ball mill | 600° C., 3 hours | 1.2 | 89 |
| Example 28 | $LiNi_{0.34}Co_{0.33}Mn_{0.33}O_2:LiMn_{0.8}Fe_{0.15}Mg_{0.05}PO_4$ = 70:20 | $Li_{2.2}Na_{1.7}Ti_{5.7}Nb_{0.3}O_{14}$ | Wet ball mill | 600° C., 3 hours | 1.3 | 92 |
| Example 29 | $LiMn_{1.8}Al_{0.2}O_4:LiCoO_2$ = 70:20 | $Li_{2.2}Na_{1.7}Ti_{5.7}Nb_{0.3}O_{14}$ | Wet ball mill | 600° C., 3 hours | 1.1 | 88 |
| Example 30 | $LiNi_{0.8}Co_{0.1}Mn_{0.1}O_2:LiCoO_2$ = 70:20 | $Li_{2.2}Na_{1.7}Ti_{5.7}Nb_{0.3}O_{14}$ | Wet ball mill | 600° C., 3 hours | 1.2 | 84 |
| Comparative Example 4 | $LiNi_{0.34}Co_{0.33}Mn_{0.33}O_2$ | $Li_{2.2}Na_{1.7}Ti_{5.7}Nb_{0.3}O_{14}$ | None | None | 0.63 | 80 |

In Table 2, the "washing condition" represents the washing condition of the negative electrode active material; the "reheat treatment condition" represents the condition in the reheat treatment after washing the negative electrode active material; "A0" represents the mole content ratio of Li to Ti and Nb at the surface of the negative electrode active material particles; "A5" represents the mole content ratio of Li to Ti and Nb at a depth of 5 nm from the surface of the negative electrode active material particles; and the "capacity retention ratio" represents the discharge capacity at the 200th cycle with respect to the discharge capacity at the first cycle, obtained by the cycle test by percentage.

From Table 2, it is found that the capacity retention ratio of Example 23 in which the wet ball milling is performed using the aqueous solution and the reheat treatment is performed at 600° C. for 3 hours is notably improved by contrast of Example 23 with Comparative Example 4. It is found that excellent capacity retention ratio can be achieved also when the composition of the positive electrode active material is variously changed. That is, according to the nonaqueous electrolyte battery according to the embodiment, it is found that excellent cycling characteristics can be achieved.

The active material according to at least one embodiment and Example described above contains active material particles containing orthorhombic Na-containing niobium titanium composite oxide. In the active material, a mole content ratio A5 of Li to Ti and Nb at a depth of 5 nm from a surface of the active material particles with respect to a mole content ratio A0 of Li to Ti and Nb at the surface of the active material particles, obtained by X-ray photoelectron spectroscopy measurement satisfies the following formula (1).

$$1 \leq A5/A0 \tag{1}$$

Thereby, the active material according to the first embodiment can achieve a nonaqueous electrolyte battery having excellent life characteristics.

The invention claimed is:

1. An active material comprising active material particles containing orthorhombic Na-containing niobium titanium composite oxide, and satisfying the following formula (1):

$$1.2 \leq A5/A0 \tag{1}$$

where A5 is a mole content ratio of a Li mole content L5 to a total of a Ti mole content T5 and a Nb mole content N5, and each of the Li mole content L5, the Ti mole content T5, and the Nb mole content N5 is a value according to an X-ray photoelectron spectroscopy measurement, obtained at a depth of 5 nm from surfaces of the active material particles, and A0 is a mole content ratio of a Li mole content L0 to a total of a Ti mole content T0 and a Nb mole content N0, and each of the Li mole content L0, the Ti mole content T0, and the Nb mole content N0 is a value according to the X-ray photoelectron spectroscopy measurement, obtained at the surfaces of the active material particles, wherein the orthorhombic Na-containing niobium titanium composite oxide is represented by the general formula $Li_{2+v}Na_{2-w}M1_xTi_{6-y-z}Nb_yM2_zO_{14+\delta}$, M1 is at least one element selected from the group consisting of Cs, K, Sr, Ba, Mg, and Ca, M2 is at least one element selected from the group consisting of Zr, Sn, V, Ta, Mo, W, Fe, Co, Mn, and Al, and $0 \leq v \leq 4$, $0 < w < 2$, $0 \leq x < 2$, $0 < y < 6$, $0 \leq z < 3$, and $-0.5 \leq \delta \leq 0.5$ hold.

2. The active material according to claim 1, wherein the ratio A5/A0 is 1.2 to 2.

3. The active material according to claim 1, wherein the mole content ratio of the active material particles is gradually increased toward a position at a depth of 5 am from the surface from a position of the surface.

4. The active material according to claim 1, wherein the element M1 is at least one element selected from the group consisting of Sr, Mg, and Ba.

5. The active material according to claim 1, wherein the element M2 is at least one element selected from the group consisting of Zr, Al, V, and Mo.

6. A nonaqueous electrolyte battery comprising:
a positive electrode;
a negative electrode containing the active material according to claim 1, and
a nonaqueous electrolyte.

7. The nonaqueous electrolyte battery according to claim 6, wherein the positive electrode contains at least one selected from the group consisting of lithium cobalt oxide, lithium nickel cobalt manganese composite oxide, spinel lithium manganese composite oxide, and lithium manganese iron composite phosphate having an olivine structure.

8. A battery pack comprising the nonaqueous electrolyte battery according to claim 6.

9. The battery pack according to claim 8, further comprising:
an external power distribution terminal; and
a protective circuit.

10. The battery pack according to claim 8,
wherein
the battery pack comprises a plural of nonaqueous electrolyte batteries, and
the nonaqueous electrolyte batteries are electrically connected in series, in parallel, or in combination of series and parallel.

11. A vehicle comprising the battery pack according to claim 8.

12. The vehicle according to claim 11, wherein the battery pack recovers regenerative energy of power of the vehicle.

13. The active material according to claim 1, wherein the ratio $A_5/A_0$ is 1.2 to 1.7.

14. An electrode comprising the active material according to claim 1.

* * * * *